US012372083B2

(12) United States Patent
Caldwell et al.

(10) Patent No.: US 12,372,083 B2
(45) Date of Patent: Jul. 29, 2025

(54) ELECTRONICALLY COMMUTATED HYDRAULIC MACHINE AND OPERATING METHOD TO REDUCE GENERATION OF RESONANCE EFFECTS

(71) Applicant: ARTEMIS INTELLIGENT POWER LIMITED, Midlothian (GB)

(72) Inventors: Niall James Caldwell, Edinburgh (GB); Daniil Dumnov, Edinburgh (GB); Matthew Green, Edinburgh (GB); Stephen Laird, Edinburgh (GB); Jill Macpherson, Edinburgh (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 143 days.

(21) Appl. No.: 17/911,110

(22) PCT Filed: Mar. 9, 2021

(86) PCT No.: PCT/GB2021/050586
§ 371 (c)(1),
(2) Date: Sep. 12, 2022

(87) PCT Pub. No.: WO2021/181086
PCT Pub. Date: Sep. 16, 2021

(65) Prior Publication Data

US 2023/0118844 A1 Apr. 20, 2023

(30) Foreign Application Priority Data

Mar. 10, 2020 (EP) .................................... 20162253

(51) Int. Cl.
*F04B 49/22* (2006.01)
*F03C 1/053* (2006.01)
(Continued)

(52) U.S. Cl.
CPC .............. *F04B 49/22* (2013.01); *F03C 1/045* (2013.01); *F03C 1/053* (2013.01); *F04B 1/06* (2013.01);
(Continued)

(58) Field of Classification Search
CPC ........ F04B 49/22; F04B 7/0076; F04B 1/063; F04B 49/065; F04B 1/053; F04B 49/06;
(Continued)

(56) References Cited

U.S. PATENT DOCUMENTS 6,183,207 B1 2/2001 Sturman
11,555,293 B2 * 1/2023 Caldwell ............... E02F 9/2235
(Continued)

FOREIGN PATENT DOCUMENTS

EP 2055943 A1 5/2009
EP 2055946 A1 5/2009
(Continued)

OTHER PUBLICATIONS

Ehsan, Md., et al., "Modeling of Digital-Displacement Pump-Motors and Their Application as Hydraulic Drives for Nonuniform Loads.", Journal of Dynamic Systems, Measurement, and Control, (2000); vol. 122, pp. 210-215.
(Continued)

*Primary Examiner* — Peter J Bertheaud
(74) *Attorney, Agent, or Firm* — Oliff PLC

(57) ABSTRACT

A hydraulic apparatus including an electronically commutated machine having a plurality of working chambers which are controlled on each cycle of working chamber volume to carry out active or inactive cycles of working chamber volume allows only a plurality of defined fractions of cycles to be active cycles to avoid generating frequencies of active cycles which cause low frequency resonances. The demand signal may be quantised into fractions m/n where n is an
(Continued)

integer below a threshold selected to avoid repeating patterns of active cycles of more than a cut-off length.

19 Claims, 7 Drawing Sheets

(51) Int. Cl.

| | |
|---|---|
| ***F03C 1/40*** | (2006.01) |
| ***F04B 1/06*** | (2020.01) |
| ***F04B 7/00*** | (2006.01) |
| ***F04B 49/03*** | (2006.01) |
| ***F04B 49/035*** | (2006.01) |
| ***F04B 49/06*** | (2006.01) |
| ***F04B 49/24*** | (2006.01) |
| ***F15B 11/17*** | (2006.01) |

(52) U.S. Cl.
CPC ............ *F04B 7/0076* (2013.01); *F04B 49/03* (2013.01); *F04B 49/035* (2013.01); *F04B 49/06* (2013.01); *F04B 49/065* (2013.01); *F04B 49/24* (2013.01); *F15B 11/17* (2013.01); *F15B 2211/6652* (2013.01)

(58) Field of Classification Search
CPC .......... F04B 49/03; F04B 1/06; F04B 49/035; F04B 49/24; F03C 1/045; F03C 1/053; F15B 2211/6652; F15B 11/17
See application file for complete search history.

(56) References Cited

U.S. PATENT DOCUMENTS

| | | | | |
|---|---|---|---|---|
| 2010/0143171 | A1 | 6/2010 | Gaumnitz et al. | |
| 2020/0080286 | A1 | 3/2020 | Caldwell | |
| 2020/0080551 | A1 | 3/2020 | Caldwell et al. | |
| 2020/0208521 | A1* | 7/2020 | Caldwell | F04B 53/001 |
| 2022/0049462 | A1 | 2/2022 | Caldwell et al. | |

FOREIGN PATENT DOCUMENTS

| | | | |
|---|---|---|---|
| EP | 2851562 | A1 | 3/2015 |
| JP | 2014-533810 | A | 12/2014 |
| WO | 2004/025122 | A1 | 3/2004 |
| WO | 2013/114436 | A1 | 8/2013 |
| WO | 2013/114437 | A1 | 8/2013 |
| WO | 2015/040360 | A1 | 3/2015 |

OTHER PUBLICATIONS

Apr. 7, 2021 International Search Report issued in Patent Application No. PCT/GB2021/050586.

* cited by examiner

ELECTRONICALLY COMMUTATED HYDRAULIC MACHINE AND OPERATING METHOD TO REDUCE GENERATION OF RESONANCE EFFECTS

FIELD OF THE INVENTION

The invention relates to the field of electronically commutated hydraulic machines.

BACKGROUND TO THE INVENTION

Electronically commutated hydraulic machines are known in which the displacement of working fluid by each working chamber is controlled for each individual cycle of working chamber volume by the active control, in phased relation with cycles of working chamber volume, of at least low-pressure valves which connect each working chamber to a low-pressure manifold and in some embodiments (for example if the machines are to function as motors) high-pressure valves which connect each working chamber to a high-pressure manifold. Such machines can respond rapidly to changes in demand and can very closely match output to a fluctuating demand signal.

The invention relates particularly to electronically commutated machines which intersperse active cycles of working chamber volume, where there is a net displacement of working fluid, with inactive cycles of working chamber volume, where there is no net displacement of working fluid. Typically, the majority or all of the active cycles are full stroke cycles, in which the working chambers displace a predetermined maximum displacement of working fluid by suitable control of the timing of the valve actuation signals. It is also known to regulate the low- and optionally high-pressure valves to regulate the fraction of maximum displacement made during an active cycle by operating so-called part stroke cycles. However such machines typically intersperse active and inactive cycles, with the active cycles being full stroke cycles, with the fraction of cycles which are active cycles (the active cycle fraction) varied to achieve a demanded fractional displacement, instead of operating with only part stroke cycles.

We have found that problems can occur when such machines are operated at some specific fractions of their maximum output. Examples of this can be found at low fractions of their maximum output and at high fractions of their maximum output. In the low fraction case, the machines may carry out only occasional active cycles, with inactive cycles therebetween, leading to highly pulsatile flow. We have found that, sometimes, this pulsatile flow can lead to vibrations (especially those of low frequency) and to resonance affects. For example, if such a machine is operated at 5% of maximum displacement per shaft revolution, and this is implemented by carrying out an active cycle followed by 19 consecutive inactive cycles and then repeating this pattern, and if the working chambers are equally spaced in phase, this will give rise to vibrations at 1/20th of the frequency of working chamber selection (the frequency with which working chambers are committed to either active or inactive cycles). If this corresponds with a resonant frequency of a component of the apparatus, it may lead to undesirable shaking or damage. For example, if the apparatus is an excavator then low frequency pulsatile flow may cause the operator's cabin to shake. Thus repeating patterns of working chamber (e.g. cylinder) activation (i.e. working chambers carrying out active cycles) leads to generation of corresponding frequencies of movement (and in some cases harmonics thereof).

Resonance affects can also occur due to patterns of cylinders carrying out inactive cycles. For example, if the same machine is operated at 95% of maximum displacement, it will predominantly carry out active cycles, with every twentieth cycle being an inactive cycle. This pattern of cylinder inactivation can again generate resonance affects at a frequency equal to 1/20 of the frequency of working chamber actuation. Strong resonances can also occur just above and just below 50% of maximum displacement.

The present invention therefore seeks to provide electronically commutated hydraulic machines, which intersperse active and inactive cycles of working chamber volume, which suppress or avoid generation of specific resonant frequencies, particularly low frequencies.

WO 2015/040360 (Abrahams et al.) disclosed a machine which in which the pattern of valve actuation signals was regulated so that the frequency of one or more intensity peaks of the frequency spectrum of the pattern of active and inactive cycles of working chamber did not remain within one or more ranges of undesirable frequencies. The invention seeks to provide an alternative approach, which is typically less complex to implement.

SUMMARY OF THE INVENTION

According to a first aspect of the invention there is provided a method of operating an apparatus, the apparatus comprising a prime mover and a plurality of hydraulic actuators, a hydraulic machine having a rotatable shaft in driven engagement with the prime mover and comprising a plurality of working chambers having a volume which varies cyclically with rotation of the rotatable shaft (e.g. each chamber may be defined by a cylinder within which a piston reciprocates in use), a hydraulic circuit extending between a group of one or more working chambers of the hydraulic machine and one or more of the hydraulic actuators, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, the hydraulic machine being configured to actively control at least the low-pressure valves (and in some embodiments also the high-pressure valves) of the group of one or more working chambers to select the net displacement of hydraulic fluid by each working chamber on each cycle of working chamber volume, and thereby the net displacement of hydraulic fluid by the group of one or more working chambers, responsive to a demand signal, the method comprising controlling the said valves to cause each working chamber to carry out either an active or an inactive cycle of working chamber volume during each cycle of working chamber volume, characterised in that the fraction of working chambers which carry out active cycles is variable and is selected from a plurality of discrete fractions.

According to a second aspect of the invention there is provided an apparatus comprising a prime mover and a plurality of hydraulic actuators, a hydraulic machine having a rotatable shaft in driven engagement with the prime mover and comprising a plurality of working chambers having a volume which varies cyclically with rotation of the rotatable shaft (e.g. each chamber may be defined by a cylinder within which a piston reciprocates in use), a hydraulic circuit extending between a group of one or more working chambers of the hydraulic machine and one or more of the hydraulic actuators, each working chamber of the hydraulic machine comprising a low-pressure valve which regulates the flow of hydraulic fluid between the working chamber and a low-pressure manifold and a high-pressure valve which regulates the flow of hydraulic fluid between the working chamber and a high-pressure manifold, the hydraulic machine comprising a controller configured to actively control at least the low-pressure valves (and in some embodiments also the high-pressure valves) of the group of one or more working chambers to select the net displacement of hydraulic fluid by each working chamber on each cycle of working chamber volume, and thereby the net displacement of hydraulic fluid by the group of one or more working chambers, responsive to a demand signal, the controller configured (e.g. programmed) to control the said valves to cause each working chamber to carry out either an active or an inactive cycle of working chamber volume during each cycle of working chamber volume, characterised in that the apparatus is configured such that the fraction of working chambers which carry out active cycles is variable and is selected from a plurality of discrete fractions.

It may be that the controller of the hydraulic machine is configured such that the fraction of working chambers which carry out active cycles is variable and can be one of a plurality of discrete fractions. It may be that the apparatus is configured such that the controller of the hydraulic machine receives only demand signals which are selected from a plurality of discrete values to thereby cause the fraction of working chambers which carry out active cycles to be variable and selected from a plurality of discrete fractions.

By 'active cycles' we refer to cycles of working chamber volume which make a net displacement of working fluid. By 'inactive cycles' we refer to cycles of working chamber volume which make no net displacement of working fluid (typically where one or both of the low-pressure valve and high-pressure valve remain closed throughout the cycle). Typically, active and inactive cycles are interspersed to meet the demand indicated by the demand signal. This contrasts with machines which carry out only active cycles, the displacement of which may be varied. By working chamber selection decisions we refer to decisions whether a working chamber undergoes an active or inactive cycle of working chamber volume. These typically occur when the rotatable shaft is at each of a plurality of discrete angles. By 'active cycle fraction' we refer to the fraction of working chambers which carry out active cycles. This is also known as an enabling fraction. The demand signal is typically processed as a 'displacement fraction', Fd, being a target fraction of maximum displacement of working fluid per rotation of the rotatable shaft. A demand expressed in volumetric terms (volume of working fluid per second) can be converted to displacement fraction taking into account the current speed of rotation of the rotatable shaft and the number of working chambers connected in a group to the same high pressure manifold and actuator(s). The demand signal relates to a demand for the combined fluid displacement of the group of one or more working chambers fluidically connected to the said one or more of the hydraulic actuators through the hydraulic circuit. There may be other groups of one or more working chambers fluidically connected to one or more other hydraulic actuators having respective demand signals.

The plurality of discrete fractions are selected to avoid the generation of resonant oscillations at unwanted frequencies, particularly resonances at frequencies below a predetermined minimum frequency. Typically, the plurality of discrete fractions are selected to avoid generating any repeating patterns of active and inactive cycles of working chamber volume with a length greater than a predetermined maximum repeat pattern length. Typically, the plurality of discrete fractions does not include any fractions with a denominator greater than a predetermined maximum denominator, when expressed as irreducible fractions.

This may avoid or reduce negative effects of resonant oscillations which would otherwise occur such as damage to components, unacceptable noise and vibration as experienced by the operator. Apparatus containing hydraulic pumps and motors can be damaged by oscillations arising from the operation of the hydraulic pump or motor.

The selection of a plurality of discrete fractions typically takes into account a predetermined operating speed (which may be a typical or minimum typical operating speed) of rotation of the rotatable shaft (as the speed of rotation of the rotatable shaft dictates the frequency of working chamber cycles).

Typically, the demand signal to which the hydraulic machine responds is quantised, having one of a plurality of discrete values. The discrete values may also be discrete fractions (e.g. active cycle fractions). These discrete values may be the same as the discrete fractions. However, this will depend on the units of the demand signal and the way in which the demand signal is processed to make decisions as to whether working chambers undergo active or inactive cycles. Thus, because at least the low-pressure valves (and in some embodiments also the high-pressure valves) of the working chambers are controlled to select the net displacement of hydraulic fluid by each working chamber on each cycle of working chamber volume, this causes the fraction of working chambers which carry out active cycles to be variable whilst being a fraction selected from a plurality of discrete fractions.

The plurality of discrete fractions (and the plurality of discrete values, where applicable) can be seen as a group of (a finite number of) discrete fractions (values), from which one value is selected at any given time. The plurality of discrete fractions (or values) are typically stored on a solid state memory device in electronic communication with a controller of the machine and read from the solid state memory as required.

It may be that an (optionally continuous) demand signal is received and is quantised, for example by selecting the discrete value closest to the received demand, or the next discrete value above or below the received demand signal. Hysteresis may be applied in the quantisation step, to avoid chatter.

The plurality of discrete values, and the plurality of discrete fractions, may be representative of the corresponding fraction of the maximum displacement of working fluid per rotation of the rotatable shaft by the group of one or more working chambers (displacement fraction, Fd).

There may be a step of determining the discrete values, for example calculating them or reading them from memory, and they may be variable, for example depending on the speed of rotation of the rotatable shaft.

Where the demand signal is quantised, the patterns of active and inactive cycles at these discrete displacement fractions ("quantised displacements") cause cylinder activations patterns (i.e. patterns of cylinders carrying out active or inactive cycles) with known frequency content and, as such, the smallest frequency repeating cylinder activation pattern present is known.

Thus, the pattern of valve command signals is controlled to reduce unwanted vibrations by preventing certain ranges of Fd. This does mean that the target net displacement is sometimes not met exactly. However, in some closed loop feedback systems any errors arising from this can be corrected for, as the machine will sometimes work at a discrete fraction in excess of the demanded displacement fraction and sometimes work at a discrete fraction below the demanded displacement fraction.

One example of a system whereby a volume error is not tolerated would be one based on open loop displacement control that requires the pump to deliver the exact volume of fluid requested. Closed loop pressure control with an integral term, such as an LS (load sense) system, will also suffer with quantisation. The displacement demand may cycle between two discrete displacement levels when the continuous displacement demand level is between two discrete levels from the quantisation table. As an Example, say we are at steady state, and we are controlling to 20 bar. The lower displacement level would provide 18 bar and the higher displacement level provides 25 bar. Let's take the case that the nearest discrete level is below the continuous displacement level. The selected discrete level delivers a flow rate from the pump that is lower than the flow rate that would result from the continuous displacement level demand. It delivers 18 bar. This causes the integrator term in the pressure control loop to rise. At some point, this integral term will become large enough to cause the continuous displacement demand level to be nearer the higher discrete displacement level and the selected discrete displacement will rise to this higher level. The delivered pressure will be 25 bar, so the integral term will start to decrease. At some point it will become low enough to drop the displacement level demanded of the pump. This cycle may continue indefinitely and this may happen at low frequency and introduce low frequency content into the hydraulic line.

However, it may be that the timing of the opening or closing of at least the low-pressure (and in some embodiments also the high-pressure) valves are regulated to vary the fraction of maximum stroke volume which is displaced by each working chamber during each active cycle. The fraction of maximum stroke which is displaced can be coordinated with the active cycle fraction (for example by the apparatus controller) to cause the hydraulic machine to displace the displacement fraction indicated by the demand signal while the active cycle fraction is restricted to be only one of the plurality of discrete fractions.

It may be that this enables a continuous range of displacements per revolution of the rotatable shaft to be generated although the fraction of working chambers which carry out active cycles is limited to be one of a plurality of discrete fractions. This would enable all displacements per revolution of the rotatable shaft (from zero to full) effectively creating a (fully) variable displacement hydraulic machine (fully continuous displacement is possible using a finite number of discrete active cycle fractions). All fractions of maximum displacement can be achieved, by allowing a range of maximum stroke volume variation from 0-100% but it is also possible with a restriction of the maximum stroke volume variation of 0-5% and 95-100%, or 0-10% and 90-100%. It may be that the fraction of maximum stroke volume which is displaced by each working chamber during each cycle is varied between 0 and x % and between y % and 100% where $x<25$ and $y>75$, or even where $x<=10$ and $y>=90$. This is because part stroke displacements in these ranges can be generated by actuating valves only near the beginning or end of strokes (within cycles of working chamber volume) when the fluid flow rate in or out of the working chambers is limited.

The plurality of discrete fractions and/or the plurality of discrete values of the demand signal may or may not be equally spaced. The discrete fraction and/or the discrete values of the demand signal may or may not vary with the speed of rotation of the rotatable shaft. If they vary with the speed of rotation of the rotatable shaft, they may be selected to reduce the generation of low frequency components. There may for example be less than 1000, or less than 100 discrete values. Where the demand signal is digital, we do not refer to the possible values imposed by binary logic but to a subset of the values which could be represented digitally given the bit size of the demand signal. Thus, the discrete values typically represent less than 10%, less than 1% or less than 0.1% of the digital values which the demand signal could have, given its bit length.

It may be that the controller receives a demand signal (typically a continuous demand signal) and determines a corresponding series of values, said series of values corresponding to a pattern of active and/or inactive cycles of working chamber volume to thereby meet the demand signal (i.e. when the demand signal ($F_d$) resulting from the pattern of active and/or inactive cycles of working chamber volume is averaged over a time period). The method may comprise receiving a demand signal (typically a continuous demand signal) and determining a corresponding series of values, said series of values corresponding to a pattern of active and/or inactive cycles of working chamber volume to thereby meet the demand signal (i.e. when the demand signal ($F_d$) resulting from the pattern of active and/or inactive cycles of working chamber volume is averaged over a time period).

For example, the controller may receive a continuous demand signal for 90% of the maximum displacement and may determine a series of values comprising at least 100 values, or preferably at least 500 values, or more preferably at least 1000 values. The series of values may comprise a repeating sequence and hence the pattern of active and/or inactive cycles may comprise a period which corresponds to the repeating sequence. The active cycles averaged over a time period will satisfy as near as 90% as possible without generating low frequency content in the sequence.

In some embodiments, the net displacement of working fluid during each active cycle is the same. This displacement is typically the maximum displacement of working fluid by each working chamber.

By fractions we refer to numbers in the range from 0 to 1 expressed as a ratio with an integer numerator and an integer denominator. By irreducible fractions we refer to fractions expressed such that the numerator and denominator do not have a common integer factor. For example, 3/6 is the same as the irreducible fraction ½.

Typically, when the discrete fractions are expressed as irreducible fractions, the denominators range up to a maximum which is selected to avoid generating repeating patterns of working chamber actuation with a frequency less than a predetermined minimum. Typically, when the discrete fractions are expressed as irreducible fractions, they comprise fractions with each integer denominator up to the maximum denominator. It may be that when the discrete fractions are expressed as irreducible fractions, they comprise fractions with each integer denominator which is a multiple of an integer i, up to the maximum denominator. (e.g. for i=3, the denominators would be 3, 6, 9, 12 . . . many such fractions would have smaller integers when expressed as irreducible fractions but the fractions would typically include 1/i, ½i, ⅓i . . . (3i−1)/3i, (2i−1)/2i, i−1/i).

The plurality of fractions may comprise or consist of (typically along with 0 and 1) each irreducible fraction having a denominator from 1 to n and a corresponding numerator m from 1 to n−1 (where m and n are integers).

The plurality of integers may comprise or consist of (typically along with 0 and 1) each irreducible fraction having a denominator which is a multiple of an integer i from i to n and a numerator m from 1 to n−1, where i>1. Where each working chamber has the same redundancy, i may equal the redundancy. By redundancy we refer to the number of working chambers in the same group of working chambers which are operated with the same phase (and so give equivalent fluid displacements with shaft angle).

A method according to any one preceding claim, wherein the smallest non-zero fraction in the plurality of discrete fractions is 1/n typically wherein the second small non-zero fraction in the plurality of discrete fractions is 1/(n−1) where n is an integer.

It may be that the smallest non-zero fraction in the plurality of fractions is selected so that at a target operational speed of rotation of the rotatable shaft, the frequency of the repeating pattern of active cycles of working chamber volume is above a predetermined minimum allowable frequency.

It may be that the smallest non-zero fraction in the plurality of discrete fractions is selected taking into account that two or more working chambers have the same phase or that there are uneven phase differences between two or more working chambers.

This may comprise processing data representing the relative phase of working chambers and/or taking into account that some working chambers may have cycles of working chamber volume which are synchronised. The method may comprise calculating the number of consecutive working chambers in a group of working chambers required to generate a repeating pattern, typically taking into account the phase difference and/or redundancy of the working chambers in the group.

However, it may be that the discrete fractions (active cycle fractions) and/or the plurality of discrete values of the quantised demand signal (where applicable) are determined by simulation or experiment. In this case, discrete fractions and/or discrete values of the quantised demand signal are included in the plurality of discrete fractions (or values) in response to simulation or experiment showing that the frequency content of the resulting high pressure manifold pressure, or valve activation currents, or other signals, meets one or more acceptable frequency spectrum criteria and/or where the frequency content below a cut-off frequency is below a threshold, or where the effect of the selection of active and inactive cycles is found to be acceptable (e.g. in response to operator feedback or measurement or calculation of movement of one or more parts of an appliance), or excluded if they do not meet such criteria. Thus the plurality of discrete fractions and/or discrete values may be built up by trial and error. The minimum frequency can be determined by experiment or simulation (whether during design, manufacture or run-time) and used to calculate the highest denominator n.

The discrete fractions (active cycle fractions) and/or the plurality of discrete values of the quantised demand signal (where applicable) need not be determined before manufacture or commission of the machine or even before operation but may be calculated during runtime and/or calculated in real time taking into account pre-determined parameters (e.g. working chamber phase and redundancy data, minimum frequency) and/or current measured parameters (e.g. speed of shaft rotation).

It may be that the plurality of discrete fractions and/or the plurality of discrete values (to which the demand signal is quantised, where applicable), are varied responsive to the speed of rotation of the rotatable shaft or another operating parameter of the apparatus. That is to say, the plurality of discrete fractions (or values) may be a group of discrete fractions (or values) and a different group of discrete fractions (or values) may be used at different speed of rotation of the rotatable shaft or different value or range of another operating parameter of the apparatus. The method may comprise switching from using a first plurality of discrete fractions (or values) to a second plurality of discrete fractions (or values) when the speed of rotation of the rotatable shaft exceeds a threshold.

It may be that the plurality of discrete fractions (or values) which is used is changed in response to a change in the number of and phasing of working chambers in the group of working chambers which are connected to the high-pressure manifold.

It may be that whether a working chamber undergoes an active or an inactive cycle of working chamber volume is determined by comparing a time history of displacement demand (e.g. received displacement demand signal) with a time history of actual displacement, for example by incrementing an accumulator depending on the displacement demand signal and decrementing the accumulator depending on the amount of working fluid which is displaced.

The method extends in a third aspect to a method of calculating a plurality of discrete fractions for use in the method of the first aspect or in the apparatus of the second aspect, the method comprising inputting a minimum allowable frequency, a target operation speed of rotation of a rotatable shaft and data indicative of the number and/or phase difference between working chambers of the machine, and/or phase difference between working chambers in a group (where said group is defined in that the grouped working chambers share a common hydraulic output), calculating an integer number, n, of working chamber decision points (typically the largest integer number) between active cycles which will lead to the generation of frequencies of cylinder activation only in excess of the minimum allowable frequency, and including 1/n in the plurality of discrete fractions.

The method may further comprise including within the plurality of discrete fractions a plurality of fractions having denominators being integers up to n and numerators being integers up to n−1, after removing duplicate values.

The method may comprise forming the plurality of discrete fractions from a plurality of fractions having denominators which are all an integer multiple (which is greater than 1) of integers.

The method may comprise forming the plurality of discrete fractions including the fractions 1/i, ½i and typically also ⅓i where i is an integer. i may equal the redundancy of working chambers.

Typically, duplicate values are removed. Fractions may be re-expressed as irreducible fractions. Fractions may be converted to binary numbers.

The method may comprise removing one or more discrete fractions from the plurality of discrete fractions to avoid the generation of repeating cylinder activation patterns with frequency components below a specific value. It may be that the frequency components arise due to unequal cylinder phasing.

The method may further comprise the step of validating whether a candidate plurality of discrete fractions (e.g. active cycle fractions) are associated with resulting discrete levels of output fluid displacement with sufficient resolution which enable one or more operating smoothness criteria to be met. If the candidate plurality of fractions would not lead to sufficiently smooth operation (due to the gaps between the discrete fractions) then the method may comprise generating an error or failure method, of recalculating a plurality of discrete fractions or respecifying the hydraulic machine (for example deciding to use a hydraulic machine with more working chambers). The discrete fractions may be used as the plurality of discrete fractions and/or the values of the quantised demand signal, where applicable.

The method may comprise step of storing the plurality of discrete fractions on a solid-state memory device for retrieval during operation.

Active and inactive cycles of working chamber volume carried out by the working chambers comprise patterns of finite periods for a given active cycle fraction. For example, the pattern of active and inactive cycles may have a minimum period of at least 0.001 s, or at least 0.005 s, or at least 0.01 s and/or may have a maximum period of at most 0.1 s, or at most 0.5 s.

In an example machine, the minimum period may be 2.4 ms (caused by the frequency of activation of all 12 equally spaced cylinders at a maximum speed of 2500 RPM).

One skilled in the art will appreciate that with higher speeds of the prime mover, or with more cylinders, the minimum period could be 1 ms (or lower).

In a primary embodiment, it is preferable to remove all frequencies below 5 Hz, thus corresponding to a period of 0.2 s.

Typically, the range of acceptable periods is selected depending on the acceptable frequency content. For applications whereby it is required to remove all frequencies below a certain value, it is necessary to specify a maximum acceptable period. From this maximum acceptable period an acceptable range of active cycle fractions will be selected dependent on the number of cylinders and on the operating range of the prime mover. For example, the range of acceptable active cycle fractions may be selected to be comprised of a plurality of discrete active cycle fractions generated using integer numerator and integer denominator values. The denominators of the plurality of active cycle fractions may be selected idepending on the rotational speed of the rotational shaft, for example, the denominators may be selected such that the period is higher than a minimum period. It is beneficial to have a short period because this corresponds to more frequent cycles of active or inactive working chamber volume and it therefore removes low frequency content from the pattern of active and inactive cycles. Typically, acceptable values of the denominators of the finite number of fractions vary depending on the rotational speed of the rotatable shaft. However, it may be that the available active cycle fractions do not change with prime mover speed and are selected to remove low frequency content at the minimum prime mover speed. As a result, frequency content at higher speeds will also be acceptable.

The frequency of working chambers carrying out active or inactive cycles is proportional to the speed of rotation of the rotatable shaft (revolutions per second) for a given active cycle fraction. The sequence of active and inactive cycles of working chamber volume does not depend on shaft speed for a given active cycle fraction.

However, the time between components of the sequence does change with the shaft speed. Thus, the frequencies arising from a particular sequence of active and inactive cycles are proportional to the speed of rotation of the rotatable shaft.

It is the repeating pattern of active or inactive chambers which is important, rather than specifically whether the cylinders are being enabled or disabled. For example, a sequence of: 0, 0, 0, 1, 0, 0, 0, 1 has the same fundamental frequency as the sequence 1, 1, 1, 0, 1, 1, 1, 0.

Accordingly, the invention recognises that the hydraulic machine will generate vibrations having intensity peaks at frequencies which depend on the pattern of active and inactive cycles carried out by the working chambers and which, for a given sequence of active and inactive cycles, is proportional to the speed of rotation of the rotatable shaft.

The method may comprise selecting a minimum allowable frequency (e.g. 5 Hz, 10 Hz), and then creating a quantised list of the plurality of discrete active cycle fractions (e.g. Fd and/or values of the quantised demand signal where applicable), said fractions selected to cause one or more patterns of active and inactive cycles, wherein said patterns only have frequency content above the minimum allowable frequency. The controller may be configured to determine a minimum allowable frequency (e.g. 5 Hz, 10 Hz), and then to create a quantised list of the plurality of discrete fractions (e.g. Fd and/or values of the quantised demand signal where applicable), said values selected to cause one or more patterns of active and inactive cycles, wherein said patterns only have frequency content above the minimum allowable frequency.

The discrete values (in the quantised list) typically correspond to the discrete fractions (of working chambers carrying out active cycles) although this is not essential because the demand signal need not be expressed in terms of a displacement fraction.

The discrete fractions (and/or the discrete values) may be dependent on the number of cylinders in the machine and/or on the operational speed of rotation of the rotatable shafts of the machine (since the speed of rotation of the rotatable shaft and number of cylinders will affect the frequencies present for a given demand value.) For each active cycle fractions, it is possible to calculate the minimum frequency present. As the machine is operating, the (filtered) demand signal is transmitted to the controller of the hydraulic machine. However, the calculation of the continuous demand signal and the quantisation of the demand signal and/or the selection of a discrete active cycle fraction could all be calculated inside the controller itself.

The minimum allowable frequency may be below 20 Hz, or even below 10 Hz. The present invention is especially useful for avoiding these kinds of low frequencies.

The invention extends in a fourth aspect to a solid-state memory device storing a plurality of discrete fractions calculated according to the method of the third aspect of the invention. The method of the first aspect may include reading the discrete fractions for the solid-state memory device of the fourth aspect. The apparatus of the second aspect may comprise the solid-state memory device of the fourth aspect in electronic communication with the controller.

The apparatus may be a vehicle, typically an industrial vehicle. For example, the apparatus may be an excavator, a telehandler or a backhoe loader. It may be that the apparatus is a car, a bus, a truck, a forklift truck and/or a wheel loader. It may be that the apparatus is an injection moulding machine or a water jet cutting unit. The apparatus may be a hydraulic power unit. The apparatus may comprise a hydraulic transmission. The apparatus may be a hydraulic hybrid vehicle transmission. The apparatus may be a renewable power generator (such as a wind turbine generator or a wave or tidal power generator). The apparatus may comprise a radio transceiver.

The apparatus may comprise a battery. The apparatus may comprise an electric terminal for electric charging. The apparatus may be a rail vehicle. The apparatus may be a (non-industrial) passenger vehicle. It may however be that the apparatus is not a vehicle.

The hydraulic machine may comprise more than 6 or more than 8 working chambers. It may be that the hydraulic machine comprises more than 12 working chambers.

It may be that the apparatus is configured to calculate the demand signal in response to a measured property of the hydraulic circuit or one or more actuators. Typically, the apparatus comprises a controller which is configured to calculate the demand signal in response to a measured property of the hydraulic circuit or the one or more of the hydraulic actuators.

The invention also extends to a method of operating the said apparatus comprising calculating the demand signal in response to a measured property of the hydraulic circuit or the one or more of the actuators.

Typically, the method comprises detecting the flow and/or pressure requirement of at least one of the one or more of the hydraulic actuators, or receiving a demand signal indicative of a demanded pressure or flow based on a pressure and/or flow demand of the one or more of the hydraulic actuators, and controlling the flow of hydraulic fluid from or to each of the group of one or more working chambers which is fluidically connected to the one or more hydraulic actuators, responsive thereto.

The method may comprise regulating the displacement of the group of one or more working chambers responsive to a measured pressure. Thus, the apparatus typically has a negative flow control loop. Optionally, the apparatus may comprise a feedforward controller configured to calculate the demand signal in response to feedforward of a measured property of the hydraulic circuit or one or more actuators (e.g. in addition to or alternative to a feedback controller configured to calculate the demand signal in response to feedback of a measured property of the hydraulic circuit or one or more actuators).

For example, the demand signal may be determined responsive to a measurement of pressure and/or a measurement of flow. The demand signal may comprise a measurement of pressure, the measurement of pressure being measured at the throttle. The demand signal may be indicative of a fraction of maximum displacement of hydraulic fluid by the group of one or more working chambers to be displaced per revolution of rotatable shaft. This is referred to herein as Fd. (Fraction of maximum displacement per revolution). Fd equals the active cycle fraction if each working chamber displaces the maximum possible volume of working fluid.

The prime mover is typically in driving engagement with the hydraulic machine. The prime mover has a rotatable shaft which is typically coupled to the rotatable shaft of the ECM (and to which the prime mover can apply torque). The prime mover (e.g. the engine) and the hydraulic machine may have a common shaft.

Where the apparatus is an excavator, the plurality of hydraulic actuators typically comprises (e.g. at least) two actuators for moving tracks (e.g. for movement of a vehicle, typically an excavator), a rotary actuator (e.g. a motor) (e.g. for rotating the cab of the excavator, relative to the base of the excavator, the base typically comprising the tracks), at least one ram actuator (e.g. for controlling an excavator arm, e.g. for the boom and/or the stick), and at least two further actuators (e.g. for controlling movement of a tool such as a bucket).

One or more low-pressure manifolds may extend to the working chambers of the hydraulic machine. One or more high-pressure manifolds may extend to the working chambers of the hydraulic machine. The hydraulic circuit typically comprises a said high-pressure manifold which extends between the said group of one or more working chambers and the said one or more actuators. The low-pressure manifold may be part of one or more said hydraulic circuits. By low pressure manifold 54 and high-pressure manifold 58 we refer to the relative pressures in the manifolds.

It may be that at least the low-pressure valves (optionally the high-pressure valves, optionally both the low-pressure valves and the high-pressure valves) are electronically controlled valves, and the apparatus comprises a controller which controls the (e.g. electronically controlled) valves in phased relationship with cycles of working chamber volume to thereby determine the net displacement of hydraulic fluid by each working chamber on each cycle of working chamber volume. The method may comprise controlling the (e.g. electronically controlled) valves in phased relationship with cycles of working chamber volume to thereby determine the net displacement of hydraulic fluid by each working chamber on each cycle of working chamber volume.

The flow rate and/or pressure requirement of a group of one or more hydraulic actuators may be determined by measuring the flow rate of hydraulic fluid to or from the group of one or more hydraulic actuators, or the pressure of hydraulic fluid in or at an output or inlet of the one or more hydraulic actuators, for example. The flow rate and/or pressure requirement may be determined from one or more measured flow rates and/or measured pressures decreasing or being below an expected value. A decrease in flow rate and/or measured pressure from an expected value indicates that insufficient flow to or from the group of one or more hydraulic actuators is taking place.

For example, it may be determined that the rate of flow of hydraulic fluid to an actuator is below an expected (e.g. target) value and a flow rate of hydraulic fluid to the actuator may be increased in response thereto. It may be determined that the rate of flow of hydraulic fluid from an actuator is above an expected (e.g. target) value (for example, as an arm or other weight is lowered) and a flow rate from the actuator may be reduced in response thereto. It may be that a pressure increase or decrease is detected at one or more hydraulic actuators and the group of one or more working chambers connected to the one or more hydraulic actuators are controlled to change (e.g. increase or decrease) the rate of flow of hydraulic fluid from the group of one or more working chambers to the one or more hydraulic actuators, or vice versa.

Groups of one or more working chambers may be dynamically allocated to respective groups of one or more hydraulic actuators to thereby change which one or more working chambers are connected to (e.g. a group of) hydraulic actuators, for example by opening or closing electronically controlled valves (e.g. high-pressure valves and low-pressure valves, described below), e.g. under the control of a controller. Groups of (e.g. one or more) working chambers may be dynamically allocated to (respective) groups of (e.g.

one or more) actuators to thereby change which working chambers of the machine are coupled to which hydraulic actuators, for example by opening and/or closing (e.g. electronically controlled) valves, e.g. under the control of a controller. The net displacement of hydraulic fluid through each working chamber (and/or each hydraulic actuator) can be regulated by regulating the net displacement of the working chamber or chambers which are connected to the hydraulic actuator or actuators.

Groups of one or more working chambers are typically connected to a respective group of one or more said hydraulic actuators through a said manifold.

The apparatus typically comprises a controller. The controller comprises one or more processors in electronic communication with memory, and program code stored on the memory. The controller may be distributed and may comprise two or more controller modules (e.g. two or more processors), for example the controller may comprise a hydraulic machine controller (comprising one or more processors in electronic communication with memory, and program code stored on the memory) which controls the hydraulic machine, and an apparatus controller (comprising one or more processors in electronic communication with memory, and program code stored on the memory) which controls the other components of the apparatus (for example, valves to change the flow path of hydraulic fluid).

It may be that the rate of flow of hydraulic fluid accepted by, or output by, each working chamber is independently controllable. It may be that the flow of hydraulic fluid accepted by, or produced by each working chamber can be independently controlled by selecting the net displacement of hydraulic fluid by each working chamber on each cycle of working chamber volume. This selection is typically carried out by the controller.

Flow and/or pressure demand may be sensed by measuring the pressure of hydraulic fluid at an input of a hydraulic actuator. Where a hydraulic actuator is a hydraulic machine, flow demand may be sensed by measuring the speed of rotation of a rotating shaft or speed of translation of a ram or angular velocity of a joint, for example. The sum of the measured pressures of flows may be summed or the maximum of the measured pressures or flows found.

The demand signal indicative of a demanded pressure or flow based on a pressure and/or flow demand of the hydraulic actuator may be a signal representing an amount of flow of hydraulic fluid, or pressure of hydraulic fluid, or the torque on the shaft of the machine or the shaft of a hydraulic actuator driven by the machine, or the power output of the machine or any other signal indicative of a demand related to the pressure or flow requirements of one or more hydraulic actuator.

Typically, the hydraulic machine is operable as a pump, in a pump operating mode or is operable as a motor in a motor operating mode. It may be that some of the working chambers of the hydraulic machine may pump (and so some working chambers may output hydraulic fluid) while other working chambers of the hydraulic machine may motor (and so some working chambers may input hydraulic fluid).

It may be that the values of the discrete values vary with speed of rotation of the rotatable shaft and are selected to avoid the generation of undesirable and/or unacceptable frequencies when the hydraulic machine controls the net displacement of the group of one or more working chambers to implement the quantised demand.

Individual working chambers are selectable, e.g. by a valve control module, on each cycle of working chamber volume, to either displace a predetermined fixed volume of hydraulic fluid (an active cycle), or to undergo an inactive cycle (also referred to as an idle cycle) in which there is no net displacement of hydraulic fluid, thereby enabling the net fluid throughput of the machine to be matched dynamically to the demand indicated by the demand signal. The controller and/or the valve control module may be operable to cause individual working chambers to undergo active cycles or inactive cycles by executing an algorithm (e.g. for each cycle of working chamber volume). The method may comprise executing an algorithm to determine whether individual working chambers undergo active cycles or inactive cycles (e.g. for each cycle of working chamber volume). The algorithm typically processes the (e.g. quantised) demand signal.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
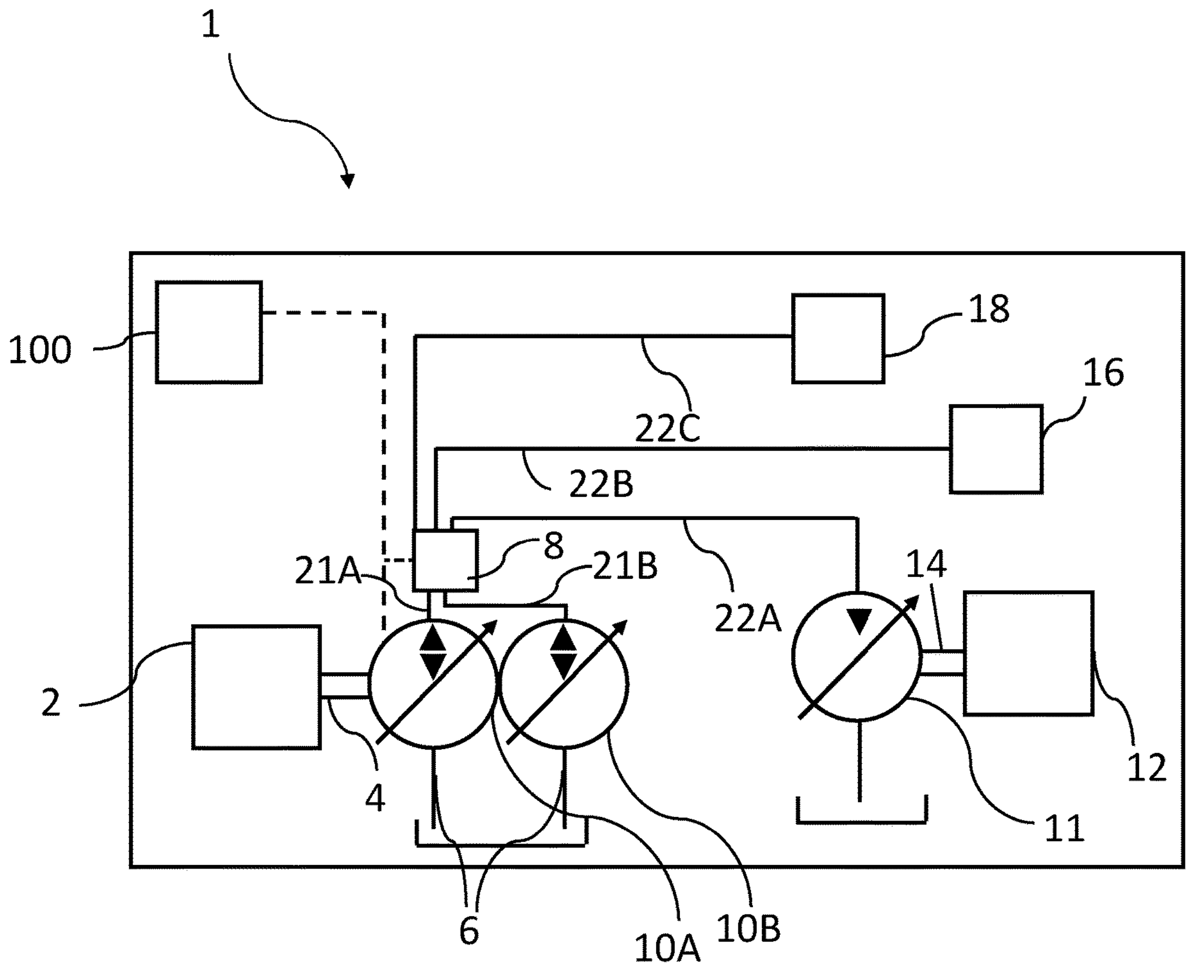
FIG. 1 is a schematic diagram of an apparatus according to the invention, including an electronically commutated hydraulic machine and actuators.

With reference to FIG. 1, an apparatus 1, for example a hydraulic excavator or other vehicle, includes an electronically commutated hydraulic machine 10 (hereafter “ECM”), comprising a first group 10A and second group 10B of working chambers, each group is respectively fluidly connected to valve block 8 via first fluid connection A and second fluid connection 21B and so that the groups of working chambers may be separately connected to one or more of high pressure manifolds 22A, 22B or 22C.

Thus as shown in this FIG. 1 embodiment the ECM 10 comprises two groups 10A and 10B, each group comprising one or more working chambers, though the number of working chambers is not illustrated in the Figure. The ECM 10 functions as the said hydraulic machine, which will be described further below with reference to FIG. 2.

The ECM may be a pump, or a motor, and in this example is operable as a pump or a motor. The ECM is driven by a prime mover 2, through a rotating shaft 4. A low-pressure manifold 6 extends from a tank to a low-pressure side input to the ECM. On the high-pressure side, the ECM has a valve block 8, which is actuatable to selectively connect different groups 10A, 10B of one or more working chambers of the electronically commutated machine to high-pressure manifolds 22*a*, 22*b* and 22*c* to thereby vary which working chambers are connected to each high-pressure manifold.

All of the working chambers (whether group 10A, or group 10B, or both groups at once, or one or more further groups) which are connected to a high-pressure manifold (so that they displace working fluid into or out of the same high-pressure manifold) function together as the group of one or more working chambers connected to one or more hydraulic actuators through the hydraulic circuit and it is the net displacement of working fluid by the one or more working chambers of the group connected to a particular one or more actuators which are controlled together to control or respond to the actuator, responsive to the demand signal. The invention is equally applicable where there is no option to change the allocation of working chambers to actuators.

Each of these high-pressure manifolds extends to an actuator, such as a further hydraulic machine 11. Machine 11 could be fixed displacement, or it could be variable displacement with valves that are electronically or mechanically (hydraulically) actuated and controlled, which drives a load 12, such as one or more wheels of the vehicle, through a further shaft 14, or another kind of hydraulic actuator 16, 18, for example the bucket of an excavator, or a ram etc. The actuators may function only as sinks or only as sources of hydraulic fluid but some or all may function as either a sink or source depending on a direction of actuation of the actuator. When driving an actuator the working chambers of the ECM which are connected to the actuator carry out pumping cycles and when driven by an actuator the working chambers of the ECM which are connected to the actuator carry out motoring cycles.

The apparatus comprises an apparatus controller 100 which receives control signals from an operator through one or more manual controls, and feedback signals, such as actuator position signals, or pressure signals from the individual hydraulic actuators 11, 16, 18 and/or high-pressure manifolds 22A, 22B, 22C and/or fluid connections 21A, 21B. The apparatus controller 100 processes these signals and controls the apparatus by calculating continuously variable demand signals for each group of working chambers, and sending these to the ECM. Furthermore, in the example shown the apparatus controller may also periodically send control signals to the valve block 8 to reconfigure which working chambers are connected to which actuators, for example in response to changes in current or possible future load, thereby changing which working chambers are in which group of one or more working chambers. However, valves in the valve block may alternatively be actuated via pilot pressure via hydraulic joysticks.

Figure 2:
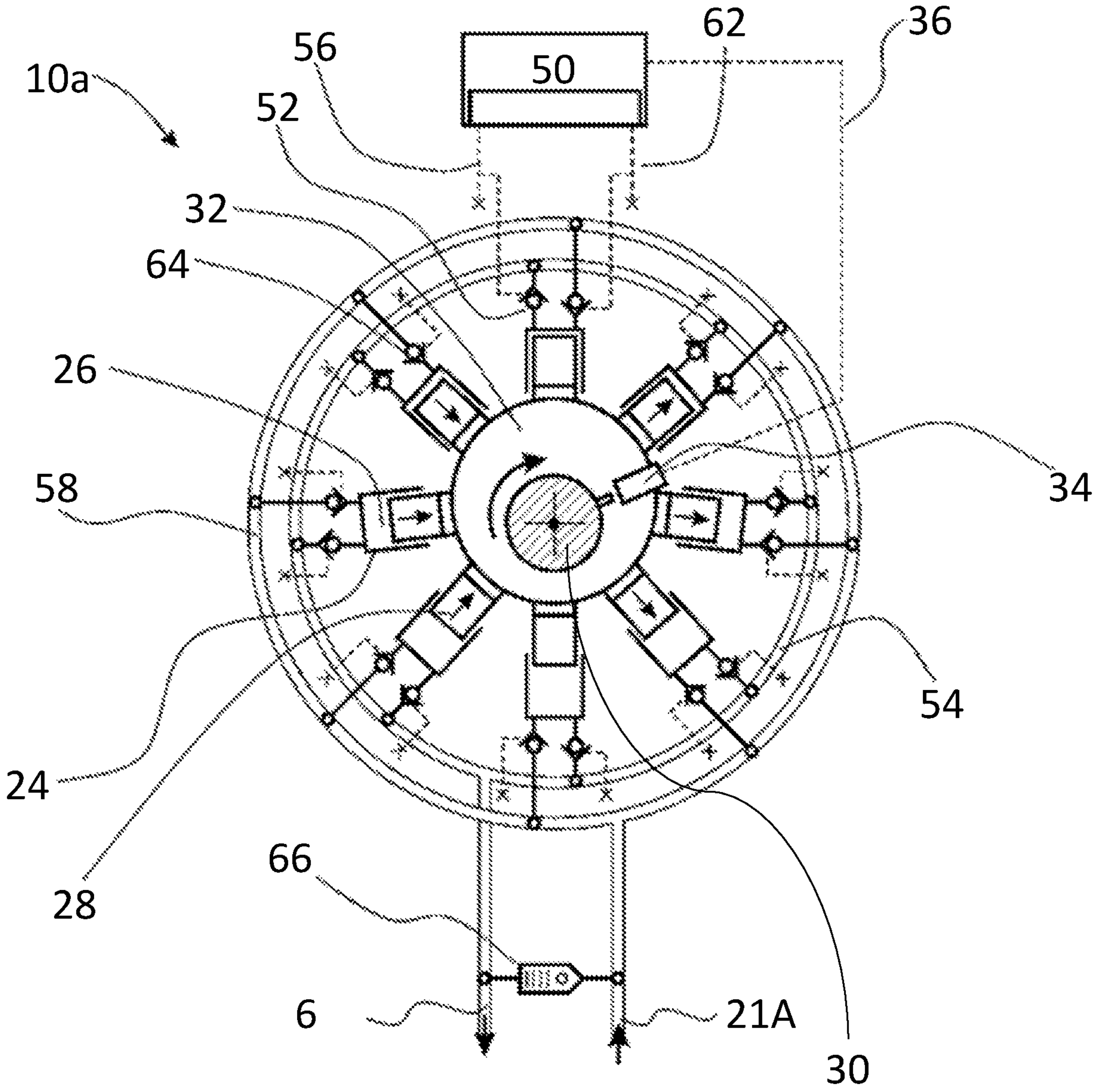
FIG. 2 is a schematic diagram of an electronically commutated hydraulic machine.

FIG. 2 is a schematic diagram of part of the ECM embodiment shown in FIG. 1, and shows a single group of working chambers currently connected to one or more actuators through a high pressure manifold 54. FIG. 2 provides detail on the first group 10A, said group comprises a plurality of working chambers (8 are shown) having cylinders 24 which have working volumes 26 defined by the interior surfaces of the cylinders and pistons 28 which are driven from a rotatable shaft 30 by an eccentric cam 32 and which reciprocate within the cylinders to cyclically vary the working volume of the cylinders. The rotatable shaft is firmly connected to and rotates with a drive shaft. A shaft position and speed sensor 34 determines the instantaneous angular position and speed of rotation of the shaft, and through a signal line 36 informs the ECM controller 50, which enables the ECM controller 50 to determine the instantaneous phase of the cycles of each cylinder.

The working chambers are each associated with Low Pressure Valves (LPVs) in the form of electronically actuated face-sealing poppet valves 52, which have an associated working chamber and are operable to selectively seal off a channel extending from the working chamber to a low-pressure hydraulic fluid manifold 54, which may connect one or several working chambers, or indeed all as is shown here, to the low-pressure hydraulic fluid manifold of the ECM. The LPVs are normally open solenoid actuated valves which open passively when the pressure within the working chamber is less than or equal to the pressure within the low-pressure hydraulic fluid manifold, i.e. during an intake stroke, to bring the working chamber into fluid communication with the low-pressure hydraulic fluid manifold but are selectively closable under the active control of the ECM controller via LPV control lines 56 to bring the working chamber out of fluid communication with the low-pressure hydraulic fluid manifold. The valves may alternatively be normally closed valves.

The working chambers are each further associated with a respective High-Pressure Valve (HPV) 64 each in the form of a pressure actuated delivery valve. The HPVs open outwards from their respective working chambers and are each operable to seal off a respective channel extending from the working chamber through valve block 8 to a high-pressure hydraulic fluid manifold 22, 58, which may connect one or several working chambers, or indeed all as is shown in FIG. 2. The HPVs function as normally-closed pressure-opening check valves which open passively when the pressure within the working chamber exceeds the pressure within the high-pressure hydraulic fluid manifold. The HPVs also function as normally-closed solenoid actuated check valves which the ECM controller may selectively hold open via HPV control lines 62 once that HPV is opened by pressure within the associated working chamber.

Typically, the HPV is not openable by the ECM controller against pressure in the high-pressure hydraulic fluid manifold. The HPV may additionally be openable under the control of the ECM controller when there is pressure in the high-pressure hydraulic fluid manifold but not in the working chamber, or may be partially openable.

In a pumping mode, the ECM controller selects the net rate of displacement of hydraulic fluid from the working chamber to the high-pressure hydraulic fluid manifold by the hydraulic motor by actively closing one or more of the LPVs typically near the point of maximum volume in the associated working chamber's cycle, closing the path to the low-pressure hydraulic fluid manifold and thereby directing hydraulic fluid out through the associated HPV on the subsequent contraction stroke (but does not actively hold open the HPV). The ECM controller selects the number and sequence of LPV closures and HPV openings to produce a flow or create a shaft torque or power to satisfy a selected net rate of displacement.

In a motoring mode of operation, the ECM controller selects the net rate of displacement of hydraulic fluid, displaced by the ECM, via the high-pressure hydraulic fluid manifold, actively closing one or more of the LPVs shortly before the point of minimum volume in the associated working chamber's cycle, closing the path to the low-pressure hydraulic fluid manifold which causes the hydraulic fluid in the working chamber to be compressed by the remainder of the contraction stroke. The associated HPV opens when the pressure across it equalises and a small amount of hydraulic fluid is directed out through the associated HPV, which is held open by the ECM controller. The ECM controller then actively holds open the associated HPV, typically until near the maximum volume in the associated working chamber's cycle, admitting hydraulic fluid from the high-pressure hydraulic fluid manifold to the working chamber and applying a torque to the rotatable shaft.

As well as determining whether or not to close or hold open the LPVs on a cycle by cycle basis, the ECM controller is operable to vary the precise phasing of the closure of the HPVs with respect to the varying working chamber volume and thereby to select the net rate of displacement of hydraulic fluid from the high-pressure to the low-pressure hydraulic fluid manifold or vice versa.

Arrows on the low pressure fluid connection 6, and the high-pressure fluid connection 21A indicate hydraulic fluid flow in the motoring mode; in the pumping mode the flow is reversed. A pressure relief valve 66 may protect the group within the ECM from damage.

In normal operation, the ECM intersperses active and inactive cycles of working chamber volume to meet the demand indicated by the received demand signal.

Figure 3:
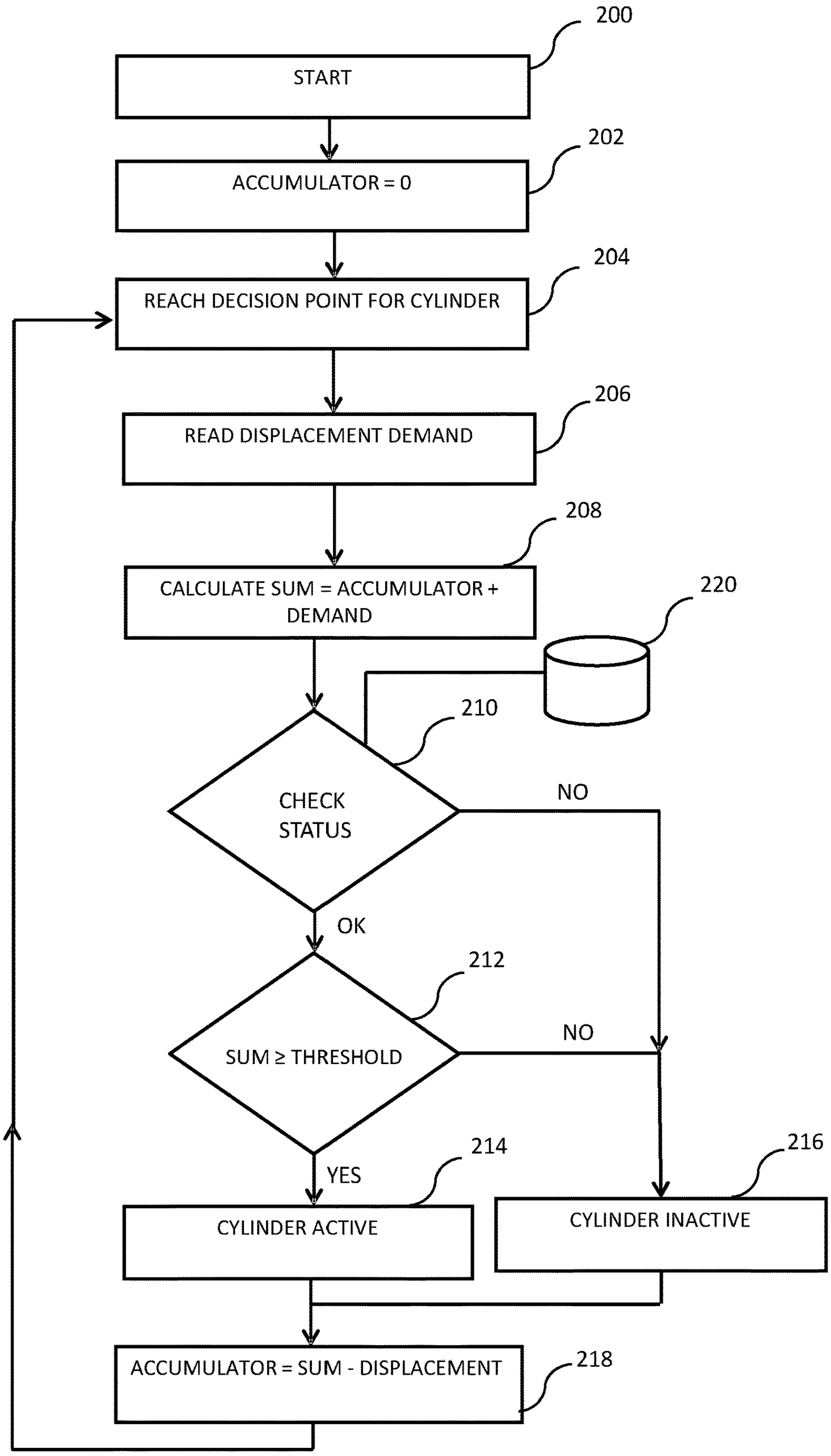
FIG. 3 illustrates the procedure carried out by the electronically commutated hydraulic machine of FIG. 2 to determine the net displacement by each cylinder sequentially.

FIG. 3 illustrates the procedure carried out by the ECM controller 50 to determine the net displacement by each cylinder sequentially. The procedure begins 200, whereupon a plurality of stored variable algorithmic accumulators are set 202 to zero. A variably algorithmic accumulator is maintained for each independently controlled group of one or more cylinders (functioning as the group of one or more working chambers) so that each group may respond to an independent demand signal. The 'algorithmic accumulator', is more commonly known in computer science as an 'accumulator', however a different term is used here to differentiate from the entirely different concept of a hydraulic accumulator. The variable algorithmic accumulator stores the difference between the amount of hydraulic fluid displacement represented by the displacement demand and the amount which is actually displaced.

The rotatable shaft of the ECM then rotates until it reaches 204 a decision point for an individual cylinder. For the example shown in FIG. 1, there are eight cylinders which are phased equally apart without any redundancy, and so each decision point will be separated by 45 degrees of rotation of the rotatable shaft. The actual period of time which arises between the decision points will therefore be the period of time required for the rotatable shaft to rotate by 45 degrees, which is inversely proportional to the speed of rotation of the rotatable shaft. In some embodiments there will however be different phases between working chamber activation decision points and there may be a plurality of working chambers which can be independently controlled but which always have the same phase.

At each decision point, the ECM controller reads 206 the demand signal in the form of a displacement fraction, Fd, received from another controller (e.g. the apparatus controller) or calculated internally using signals from the hydraulic circuit, for each group of working chambers of the ECM. For each group of working chambers, the ECM controller then calculates 208 a variable algorithmic sum which equals the relevant algorithmic accumulator plus the demanded displacement for that group. The sum takes into account the period of time since the previous decision point—which can be variable bearing in mind variations in the speed of rotation of the rotatable shaft and possible variation in the phase between working chamber decision points.

Next, the status of the cylinders which are being considered is checked 210 with reference to a database 220 of working chamber status. For each cylinder 24, if it is found that the cylinder is broken or is part of a different group of cylinders which are not connected to the actuator or actuators, then no further action is taken for that cylinder at this time. Once each cylinder (if any) which have to be further considered at the decision point has been considered, the method then repeats from step 204 once the next decision point is reached.

For each cylinder for which the decision point is relevant, the algorithmic sum for the relevant group of working chambers is compared 212 with a threshold. This value may simply be the maximum volume of hydraulic fluid displaceable by the cylinder, when the only options being considered are an inactive cycle with no net displacement or a full displacement active cycle in which the maximum displacement of hydraulic fluid by the cylinder is selected. However, the threshold may be higher or lower. For example, it may be less than the maximum displacement by an individual cylinder, for example, where it is desired to carry out a partial cycle, in which only part of the maximum displacement of the cylinder is displaced.

If algorithmic sum is greater than or equal to the threshold then it is determined that the cylinder 24 will undergo an active cycle 214. Alternatively, if algorithmic sum is not greater than or equal to the threshold then it is determined that cylinder 24 will be inactive 216 on its next cycle of cylinder 24 working volume, and will have a net displacement of zero. The accumulator value will be calculated 218 according to the displacement subtracted from algorithmic sum.

Control signals are then sent to the low 52 and high 64 pressure valves for the cylinder 24 under consideration to cause the cylinder to undergo an active or inactive cycle, as determined. (In the case of pumping, it may be that the high-pressure valves are not electronically controlled and the control signals only concern the low pressure valves). The control signals are transmitted across the respective control line 56 (low pressure) and 62 (high-pressure) for the particular valve associated with the cylinder under consideration.

For each group of working chambers (cylinders) this step effectively takes into account the displacement demand represented by the displacement demand signal, and the difference between previous displacements represented by the displacement demand signal previous net displacements determined by the ECM controller (in this case, in the form of the stored error), and then matches the time averaged net displacement of hydraulic fluid by the cylinders to the time averaged displacement represented by the displacement demand signal by causing a cylinder to undergo an active cycle in which it makes a net displacement of hydraulic fluid, if algorithmic sum equals or exceeds a threshold. In that case, the value of the error is set to SUM minus the DISPLACEMENT by the active cylinder. Alternatively, if algorithmic sum does not equal or exceed the threshold, then the cylinder is inactive and algorithmic sum is not modified.

The procedure restarts from step 204 when the next decision point is reached for one or more cylinders.

It can therefore be seen that, for each group of working chambers, an algorithmic accumulator maintains a record of the difference between the displacement which has been demanded, and the displacement which has actually occurred. On each cycle, the demanded displacement is added to the displacement error value, and the actual selected displacement is subtracted. The algorithmic accumulators effectively record the difference between demanded and provided displacement and an active cycle takes place whenever this accumulated difference exceeds a threshold. Because a separate algorithmic accumulator is maintained for each distinct group of one or more cylinders which are connected together to the same high-pressure manifold, the pressure in or flow through each high-pressure manifold connected to respective actuators can be independently controlled.

One skilled in the art will appreciate that the effects of this displacement determination algorithm can be obtained in several ways. For example, rather than subtracting the selected displacement from the algorithmic accumulator variable, it would be possible to sum the displacement which has been demanded, and the displacement which has been delivered, over a period of time, and to select the displacement of individual cylinders to keep the two evenly matched.

It can be seen that when a demand signal is low, the algorithm will lead to highly pulsatile pressure ripple as periodic active cycles will be interspersed periodically between inactive cycles. If the demand signal is a fraction 1/n of maximum demand and it remains constant at that fraction, then every nth cycle of working chamber volume will be an active cycle, with the remainder being inactive cycles, and there will be pulsatile flow with a frequency of the frequency of working chamber activation decisions points 204 divided by n. There will be similar effects when the demand signal is for example near, but less than, 100% of maximum demand, as occasional inactive cycles will take place periodically between otherwise continuous active cycles.

Although these vibrations typically initiate with relatively low amplitude, the amplitude of the vibrations can increase over time, especially if the frequency of the vibrations is at (or close to) a resonant frequency of the vehicle (or part of the vehicle). These vibrations can cause damage if the amplitude increases beyond a predetermined maximum amplitude.

According to the invention, the demand signal passed to the ECM controller and used as the input for the above algorithm is quantised, such that it has only one of a predetermined group of discrete values which, as we will explain, are selected to avoid generating repeating patterns of cylinder activation in excess of a predetermined length and so frequency components below a cut-off frequency.

Figure 4:
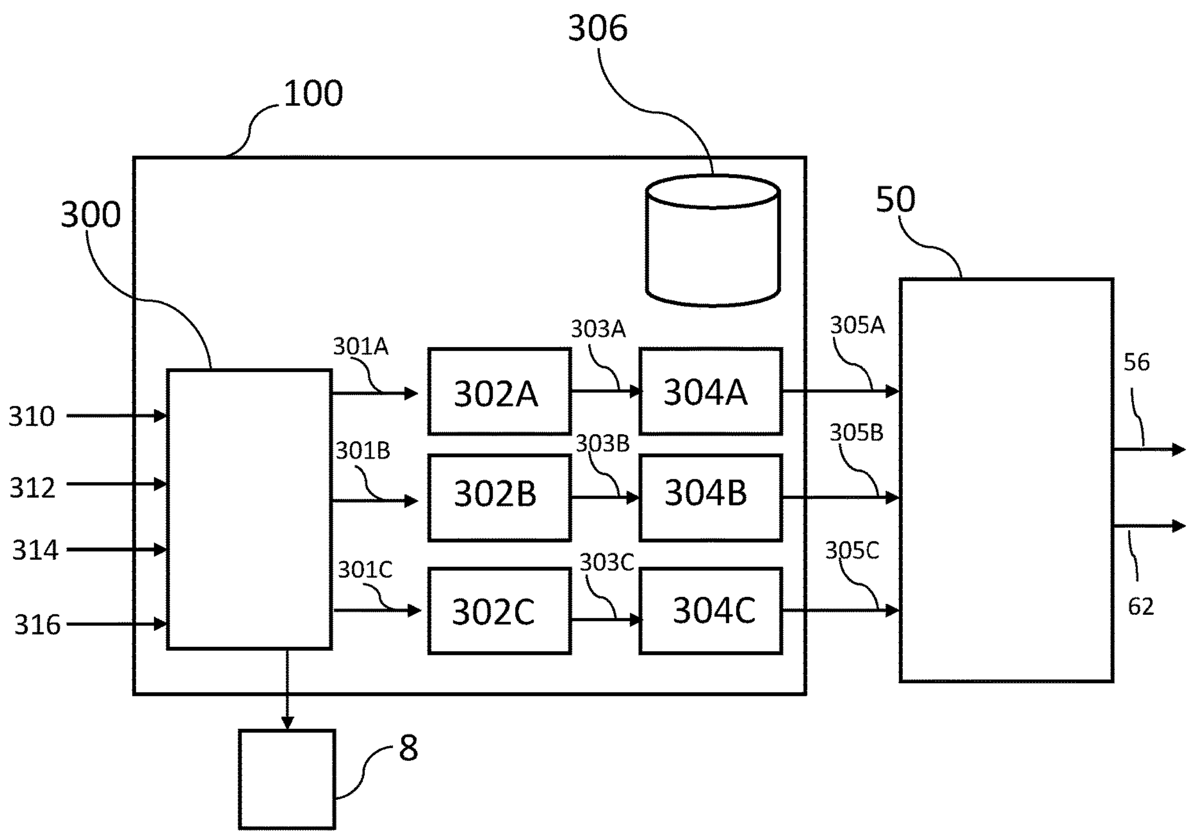
FIG. 4 is a schematic diagram of data processing to implement quantisation.

FIG. 4 is a schematic diagram of data processing implemented by the apparatus controller 100 and by the ECM controller 50, which together implement the invention. It will be apparent to one skilled in the art that the function of the apparatus controller and ECM controller may be combined, or still further distributed. Apparatus control program module 300 (represented by computer code executed by the apparatus controller) processes feedback signals 310, 312, 314 received by the apparatus controller from the actuators and high-pressure manifolds. These signals may include pressure measurements, actuator position or speed measurements etc. The apparatus controller also receives operator command signals 316 which can be input through a user interface such as a touch screen or keyboard, or a manual control, such as a joystick or lever used to control an actuator (e.g. to control the operation of hydraulic actuators of an excavator and/or to drive the vehicle). This data is used to calculate current displacement demand signals 301A, 301B, 301C for each of the groups of working chambers. In this example the displacement demand signals are expressed as Fd (fraction of maximum displacement per rotation of the rotatable shaft). These signals are then digitally processed by the apparatus controller to implement hysteresis using hysteresis logic 302A, 302B, 302C which outputs partially processed displacement demand signals 303A, 303B, 303C.

Hysteresis is useful to prevent chattering between adjacent quantisation steps and is used for all quantisation methods. The level of hysteresis in systems with no integral term, such as negative flow control systems. is specific to the compliance of the system and the relationship between pressure and displacement (which in some cases may be a proportional gain). Hysteresis is not effective with systems that have integral terms when using quantised active cycle fractions and with only full pumping strokes available; it only acts to modify the frequency of the displacement cycling. When designing a hysteresis system it is preferable to take into account that a human operator will effectively compensate for slight errors between displacement of hydraulic fluid produced and demanded, for example by adjusting a joystick position to achieve an actuator position. In some embodiments, hysteresis is only provided when the displacement demand is being reduced, and not when it is being increased. This is especially useful in the variable stroke volume embodiment described below.

Accordingly, the continuous demand signal which is fed to the ECM controller 50 and processed using the algorithm described with reference to FIG. 3 is quantised and has typically also been processed to introduce hysteresis.

The partially processed displacement demands are then quantised 304A, 304B, 304C.

Figure 5:
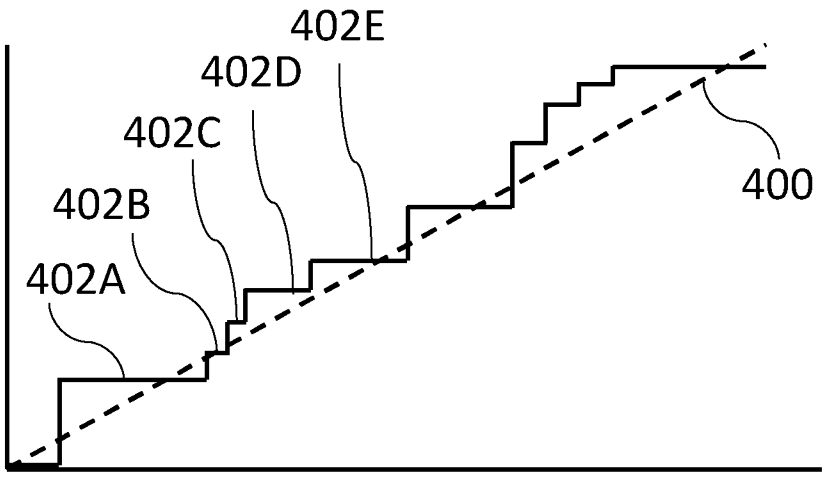
FIG. 5 is a plot of quantised output in response to a received demand signal as a function of time.

With reference to FIG. 5, instead of passing the originally calculated displacement demand signal 400 to the ECM controller 50, the demand signal is quantised, i.e. made to correspond to one of a plurality of different displacement fractions 402A, 402B, 402C, 402D, 402E, etc. This is carried out with reference to a solid state memory storing a data structure 306 setting out a plurality of discrete fractions. Active cycle fractions could also be calculated during run time without having a stored table. The quantised demand signals 305A, 305B, 305C are then passed to the ECM controller 50. The active cycle fraction could also be calculated during run time without having a stored table.

The discrete fractions are selected to avoid the generation of patterns of active, or inactive, cycles of cylinder volume, with a frequency content which is below a determined cut-off frequency, assuming a predetermined minimum speed of rotation of the rotatable shaft. Pressure pulsations in a hydraulic line will arise from and have the same frequency content as that found in the enabling patterns comprised of active and inactive cycles of cylinder working volume. This vibration can be transmitted to components. The aim of the quantisation control method is to prevent mechanical components of a system/vehicle (either directly, or indirectly, e.g. via excitation of the operator) from being excited at their natural frequency. This may arise if cylinders are enabled at the same frequency as the natural frequency of the mechanical component where there is some form of path (e.g. a mechanically coupling path) for the vibration to be transferred from the pump (or the connected hoses/pipes), to the mechanical component.

Using quantisation to remove frequencies from the cylinder enabling patterns will prevent certain displacement levels from being commanded by the ECM controller. The displacement levels can be defined in terms of volume of fluid per shaft revolution or fraction of maximum displacement of fluid per shaft revolution. When the continuous displacement level demand is not equal to one of the discrete displacement levels, the nearest discrete displacement level is selected and there is a resulting error between the continuous displacement demand and discrete displacement level. In this instance, there will therefore be an error between the demanded volume and the delivered volume of the pump. This will not be an issue in systems whereby an error is tolerated between the exact volume of fluid produced and the volume delivered.

Additionally, the human operator will effectively compensate for the slight errors between the volume of oil demanded and produced. The operator will adjust the joystick positions to achieve the desired actuator positions.

The importance of the 'minimum frequency' is that no other frequencies below it will be present in cylinder enabling patterns, when using quantisation. If the 'minimum frequency' selected is above the natural frequency of the component then the mechanical component will not resonate at its natural frequency.

To this end, the group of discrete fractions may consist of fractions having denominators up to an integer n, where n is selected so that, at the expected speed of shaft rotation, the frequency of selection of an active cycle of cylinder volume, at displacement fraction 1/n, is above the cut-off frequency.

For example, if a machine has 12 equally spaced cylinders, and rotates at 1000 rpm, then a cylinder selection decision is reached every (60/1000)/12=5 milliseconds. If the largest denominator is 5, a cylinder will carry out an active cycle every 25 milliseconds, at an active cycle fraction of ⅕ and so the smallest frequency which will be present is 40 Hz. This can be seen in the following example pattern of cylinder activation:

TABLE 1

| Cylinder | Fd demanded | Accumulator value | Cylinder active or inactive? | Time (ms) | Phase (degrees) |
|---|---|---|---|---|---|
| 1 | 0.2 | 0 | Active | 0 | 0 |
| 2 | 0.2 | 0.2 | Inactive | 5 | 30 |
| 3 | 0.2 | 0.4 | Inactive | 10 | 60 |
| 4 | 0.2 | 0.6 | Inactive | 15 | 90 |
| 5 | 0.2 | 0.8 | Inactive | 20 | 120 |
| 6 | 0.2 | 0 | Active | 25 | 150 |
| 7 | 0.2 | 0.2 | Inactive | 30 | 180 |
| 8 | 0.2 | 0.4 | Inactive | 35 | 210 |
| 9 | 0.2 | 0.6 | Inactive | 40 | 240 |
| 10 | 0.2 | 0.8 | Inactive | 45 | 270 |
| 11 | 0.2 | 0 | Active | 50 | 300 |
| 12 | 0.2 | 0.2 | Inactive | 55 | 330 |

The above table demonstrates that where Fd=1/n (in this case 5), a pattern is generated with a repeat every n cylinders. For m/n, where m and n are both integers, expressed as an irreducible fraction (i.e. where m and n have no common divisor other than 1) there will again be a pattern (during which m cylinders undergo active cycles) with a sequence length of n.

For example, the group of allowable fractions may be each fraction m/n which is an irreducible fraction and where n is from 1 to a predetermined maximum integer (in this example 5), and m is less than n (for each value of n). An example table for n=5 is shown below:
Allowable Fd:

TABLE 2

| | | | | | |
|---|---|---|---|---|---|
| 0 | 1/5 | 1/4 | 1/3 | 2/5 | 1/2 |
| 3/5 | 2/3 | 3/4 | 4/5 | 1 | |

More generally, for x cylinders which are equally distributed around a shaft with a minimum operating rotational speed r (rotations per second), a pattern which repeats every n cylinders will generate oscillations with a frequency of xr/n.

Tables with a greater maximum sequence length n can be generated by including each irreducible fraction m/n for each m up to n−1 and each n up to a determined maximum.

A larger repeating pattern length (determined by n) will lead to proportionately lower frequencies but a larger table length.

For example, for n=12 the corresponding table will be:

TABLE 3

| | | | | | |
|---|---|---|---|---|---|
| 0 | 1/12 | 1/11 | 1/10 | 1/9 | 1/8 |
| 1/7 | 1/6 | 2/11 | 1/5 | 2/9 | 1/4 |
| 3/11 | 2/7 | 3/10 | 1/3 | 4/11 | 3/8 |
| 2/5 | 5/12 | 3/7 | 4/9 | 5/11 | 1/2 |
| 6/11 | 5/9 | 4/7 | 7/12 | 3/5 | 5/8 |
| 7/11 | 2/3 | 7/10 | 5/7 | 8/11 | 3/4 |
| 7/9 | 4/5 | 9/11 | 5/6 | 6/7 | 7/8 |
| 8/9 | 9/10 | 10/11 | 11/12 | 1 | |

In practice, the fractions may be stored in binary form which will require some rounding depending on the number of significant bits which are stored. Alternatively, the displacement fraction may be calculated without the use of a stored table.

It is notable that in such tables, the smallest non-zero fractions, and therefore the smallest values of Fd which are implemented by ECM will be 1/n, 1/(n−1), 1/(n−2) . . . (until the next number in the sequence is larger than or equal to 2/n). The largest non-unity fractions will be (n−1)/n, (n−2)/(n−1), (n−3)/(n−2).

The largest displacement band gives a value for the largest displacement gap that will be present in the table—typically this will be 1/n. This gives an indication of the coarseness of the displacement steps after quantisation and therefore how acceptable the quantisation table will be. Very coarse steps in displacement may prevent accurate control of actuators which may be of particular concern in vehicle applications.

In an experiment, using an excavator having an operator cab which can oscillate at low frequencies (about 3 to 15 Hz), with the ECM driving hydraulic actuators fluidly connected to the ECM, the quantisation table of Table 2 (maximum sequence length of 12, i.e. n=12) did not excite the cab but gave sufficiently coarse displacement steps to provide an unacceptable user experience; increasing the sequence length to 24, i.e. n=24 did not excite the cab but provided displacement steps which gave an acceptable user experience; further increasing the sequence length to 36, i.e. n=36 provided an acceptable step size but the frequency content excited the cab.

Thus, there is a trade-off between minimum frequency versus the coarseness of the quantised displacement levels. Gaps of up to 5 to 10% will be acceptable in some applications. Gaps can be reduced by selecting an ECM with a greater number of working chambers at different phases, or by choosing a prime mover with a higher minimum shaft speed (or restricting the minimum shaft speed), and selecting a higher maximum denominator.

Although resonance of the cab itself is a primary concern in the particular case of a hydraulic excavator, the excitation and resonance of other bodies is also of concern. For example, movement of a vehicle cab can cause resonance of the individual operator which in turn may cause unintended movement of the joystick, thus potentially making the situation worse. The present invention is especially useful for avoiding low frequency resonance effects.

Furthermore, some displacement fractions may be deemed unallowable, for example due to a risk of exciting further resonances, and displacement fractions which are deemed unallowable can be excised from the table of displacement fractions.

In the example of Table 1, cylinders are equally spaced in phase and there is no redundancy (n cylinders are configured so that their volume cycles are spaced apart by phase 360/n°). However, ECMs are known in which the working chambers are not spaced equally in phase and/or where there is redundancy, by which we refer to a plurality of working chambers having the same phase as each other. The latter is common where cylinders are driven by a multi-lobe cam, for example, meaning that one or more working chamber cycles take place within a single rotation of the rotatable shaft. Unevenly phased working chambers may occur due to the design of the ECM or due to the allocation of working chambers to different groups of working chambers during operation.

For example, an ECM has 24 cylinders which are equally spaced in phase (360/24=15° apart). Groups of three cylinders which are 120° apart have high pressure outputs which are commoned together, giving eight independent outputs. Three of these independent outputs are connected to a first high-pressure manifold, four of these independent outputs are connected to a second high-pressure manifold, and 1 independent output is connected to a third high-pressure manifold.

The phasing of the 9 cylinders connected to the first high-pressure manifold may be as follows:

TABLE 4

| | Cylinder number | | | | | | | | |
|---|---|---|---|---|---|---|---|---|---|
| | 1 | 2 | 3 | 4 | 5 | 6 | 7 | 8 | 9 |
| Phase (°) | 0 | 30 | 60 | 120 | 150 | 180 | 240 | 270 | 300 |
| Phase difference | — | 30 | 30 | 60 | 30 | 30 | 60 | 30 | 30 |

Table 4 shows that in this embodiment the phasing between consecutive cylinders is sometimes 30° and sometimes 60°. There is therefore unequal phasing between cylinders.

In the example in table 4, the repeating cylinder phase pattern length, is 3. This number indicates how many cylinders are required to repeat the cylinder phasing. The phase difference between cylinder 1 and cylinder 2 is 30. The phase difference between cylinder 2 and cylinder 3 is 30. The phase difference between cylinder 3 and cylinder 4 is 60. This pattern then repeats. Since it takes 3 cylinders to repeat this pattern, the repeating cylinder phase pattern length is 3.

A machine may also be designed to have cylinders with duplicate phasing (redundancy). The table below shows a 6-cylinder machine with a redundancy of 2

TABLE 5

| | Cylinder number | | | | | |
|---|---|---|---|---|---|---|
| | 1 | 2 | 3 | 4 | 5 | 6 |
| Phase (°) | 0 | 0 | 120 | 120 | 240 | 240 |

The quantisation tables for such machines should be created taking into account a requirement to guarantee that a certain maximum sequence length limits the lowest frequency in the expected manner.

If all working chambers have a redundancy of greater than 1 then the denominators of the fractions may be selected to be multiples of the redundancy. Thus, where the redundancy is 3, the table may include the fractions ⅓, ⅙, ⅑, 1/12, 1/15 etc. If the machine has unequally spaced working chambers, one option is to select all the denominators which are multiples of the repeating cylinder phase pattern length. This will give the same minimum frequency as an equally spaced machine of the same number of cylinders.

It is therefore the case that in order to limit the lowest frequency, the allowable displacement levels with machines or services with unequal phasing or redundancy will be reduced. This will result in further coarseness in the quantisation table.

The following table shows the effect of working chamber redundancy in a machine with 12 cylinders. The table indicates which cylinders carry out active cycles at a displacement fraction of ⅓.

TABLE 6

| Redundancy = 1 | | | Redundancy = 2 | | | Redundancy = 3 | | |
|---|---|---|---|---|---|---|---|---|
| Cylinder phase/ degrees | Active cycle? | Enabled cylinder phase difference (degrees) | Cylinder phase/ degrees | Active cycle? | Enabled cylinder phase difference (degrees) | Cylinder phase/ degrees | Active cycle? | Enabled cylinder phase difference (degrees) |
| 0 | N | | 0 | N | | 0 | N | |
| 30 | N | | 0 | N | | 0 | N | |
| 60 | Y | 90 | 60 | Y | 120 | 0 | Y | 90 |
| 90 | N | | 60 | N | | 90 | N | |
| 120 | N | | 120 | N | | 90 | N | |
| 150 | Y | 90 | 120 | Y | 60 | 90 | Y | 90 |
| 180 | N | | 180 | N | | 180 | N | |
| 210 | N | | 180 | N | | 180 | N | |
| 240 | Y | 90 | 240 | Y | 120 | 180 | Y | 90 |
| 270 | N | | 240 | N | | 270 | N | |
| 300 | N | | 300 | N | | 270 | N | |
| 330 | Y | 90 | 300 | Y | 60 | 270 | Y | 90 |
| 0 | N | | 0 | N | | 0 | N | |
| 30 | N | | 0 | N | | 0 | N | |
| 60 | Y | 90 | 60 | Y | 120 | 0 | Y | 90 |
| 90 | N | | 60 | N | | 90 | N | |

TABLE 6-continued

| Redundancy = 1 | | | Redundancy = 2 | | | Redundancy = 3 | | |
|---|---|---|---|---|---|---|---|---|
| Cylinder phase/ degrees | Active cycle? | Enabled cylinder phase difference (degrees) | Cylinder phase/ degrees | Active cycle? | Enabled cylinder phase difference (degrees) | Cylinder phase/ degrees | Active cycle? | Enabled cylinder phase difference (degrees) |
| 120 | N | | 120 | N | | 90 | N | |
| 150 | Y | 90 | 120 | Y | 60 | 90 | Y | 90 |
| 180 | N | | 180 | N | | 180 | N | |
| 210 | N | | 180 | N | | 180 | N | |
| 240 | Y | 90 | 240 | Y | 120 | 180 | Y | 90 |
| 270 | N | | 240 | N | | 270 | N | |
| 300 | N | | 300 | N | | 270 | N | |
| 330 | Y | 90 | 300 | Y | 60 | 270 | Y | 90 |

Table 6 shows that when there is a redundancy of 1, there is a repeating pattern every 90° (i.e. the pattern repeats four times per rotation of the rotatable shaft and so at four times the frequency of rotation of the rotatable shaft); and when there is a redundancy of 3, there is a repeating pattern every 90° (i.e. the pattern repeats four times per rotation of the rotatable shaft and so at four times the frequency of rotation of the rotatable shaft). However, when there is a redundancy of 2, the phase difference between enabled cylinders is sometimes 120 degrees and the phase difference between enabled cylinders is sometimes 60 degrees. This causes a repeating pattern every 180° (i.e. the pattern repeats every half rotations of the rotatable shaft and so at twice the frequency of rotation of the rotatable shaft); In the examples with a redundancy of 1 and a redundancy of 3, an enabling fraction of 1/3 causes a frequency at 4 times the frequency of the shaft rotation. An enabling fraction of 1/3 causes a lower frequency at 2 times the frequency of the shaft rotation.

From this example it is clear that lower frequencies become present when denominators that are not integer multiples of the redundancy are used in the quantisation tables. If it was desired to remove frequencies below 2 times the frequency of shaft rotation, it would not be possible to use an enabling fraction of 1/3 in the case whereby the cylinder phasing had a redundancy of 2.

In such cases, the quantisation tables for the embodiments with redundancy >1, consist of fractions with denominators which are multiples of the redundancy. E.g. for n up to 18, the following fractions are calculated, then sorted and duplicates are removed: 1/3, 2/3,3/3, 1/6, 2/6, 3/6, 4/6, 5/6, 6/6, 1/9, 2/9, 3/9, 4/9, 5/9, 6/9, 7/9, 8/9, 9/9, 1/12, 2/12, 3/12, 4/12, 5/12, 6/12, 7/12, 8/12, 9/12, 10/12, 11/12, 12/12, 1/15, 2/15, 3/15, 4/15, 5/15, 6/15, 7/15, 8/15, 9/15, 10/15, 11/15, 12/15, 13/15, 14/15, 15/15, 1/18 2/18 3/18 4/18 5/18 6/18 7/18 8/18 9/18 10/18 11/18 12/18 13/18 14/18 15/18 16/18 17/18 18/18.

Reduced to irreducible fractions this gives:

Allowable Fd:

TABLE 7

| | | | | | |
|---|---|---|---|---|---|
| 0 | 1/18 | 1/15 | 1/12 | 1/9 | 2/15 |
| 1/6 | 1/5 | 2/9 | 1/4 | 4/15 | 5/18 |
| 1/3 | 7/18 | 2/5 | 5/12 | 4/9 | 7/15 |
| 1/2 | 8/15 | 5/9 | 7/12 | 3/5 | 11/18 |
| 2/3 | 13/18 | 11/15 | 3/4 | 7/9 | 4/5 |
| 5/6 | 13/15 | 8/9 | 11/12 | 14/15 | 17/18 |
| 1 | | | | | |

Figure 6:
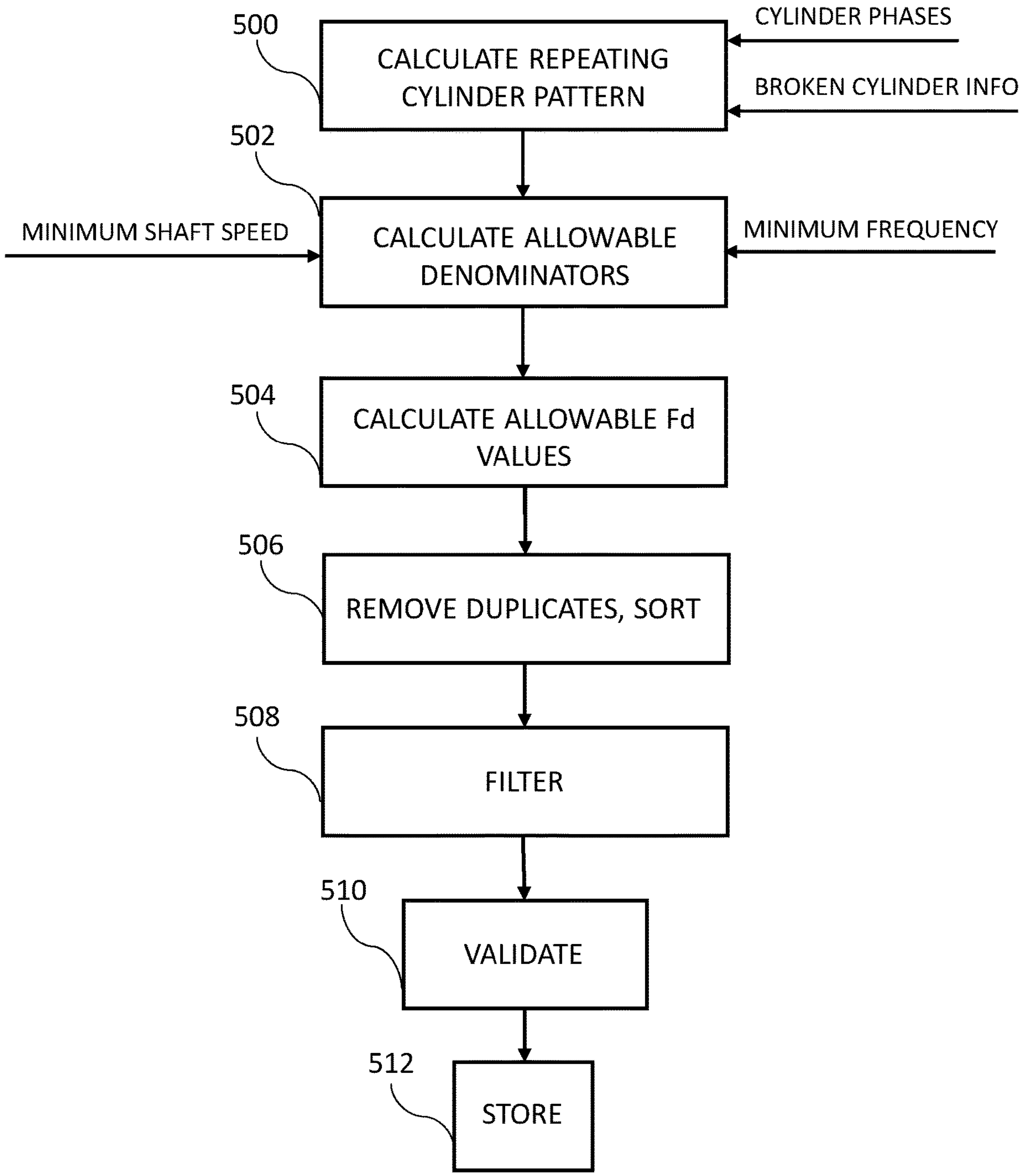
FIG. 6 is a flow diagram of a procedure for creating a quantisation table (plurality of discrete fractions)

More generally, with reference to FIG. 6, the procedure for determining the quantisation table starts by calculating 500 the repeating cylinder pattern, which will depend on the relative phase difference of the individual cylinders, and whether and to what extent there is redundancy between the cylinders. Broken cylinders may also be taken into account, prior to operation (as in FIG. 6, for example by simulation or experiment), or during operation. In a simple example where there is no redundancy and each cylinder is equally phased apart, then the repeating phase difference is simply the phase spacing between the cylinders. If the cylinders are not equally spaced then the repeating pattern should be calculated by identifying the number of cylinders required to produce a repeating phase difference pattern and then summing the phase differences between all of the cylinders. This is used to determine the phase difference between repeating arrangements of working chambers. In the examples of Tables 4 and 5 this is 120°. For a machine with c cylinders which are equally spaced, with redundancy r, this is 360*r/c. The number of cylinders required to generate a repeating pattern is also determined. In the examples of Tables 4 and 5 this is 3.

In the next step, allowable denominators of the displacement fractions are calculated 502. This is calculated using the minimum expected operating shaft speed of rotation and using the number of cylinders and phase difference between repeating patterns of cylinders calculated in the previous step, and this step also includes the minimum acceptable frequency. From this, the allowable denominators, which do not lead to repeating patterns having a frequency below the minimum frequency, can be calculated. In the example of FIG. 6, with redundancy 3, with a shaft speed of 1500 rpm, and a minimum frequency of 15 Hz, the allowable denominators are 3, 6, 9, 12, 15.

Thereafter, allowable Fd values (i.e. displacement fractions which are selected as one of the available quanta) are calculated 504, using these denominators. Typically for each allowable denominator n, the quantisation table will include each m/n where m is each integer from 1 to n for each value of n.

Next, the calculated fractions are processed by removing duplicates 506 and sorting them into numerical order. In the next stage, which is optional, some Fd values may be filtered out 508 of (removed from) the calculated list, because they may generate some other resonance, e.g. of another component of the apparatus.

Thereafter there is a validation step 510, in which the calculated allowed Fd values are analysed to determine whether they provide sufficiently smooth operation for a user.

The final set of calculated FD values is then stored 512 in memory and used during operation of the machine. As mentioned above, there may be different tables of allowable Fd for different shaft speeds, or operating modes of the apparatus, for example for when different groups of working chambers are connected to an individual high-pressure manifold.

In the above examples, the apparatus controller 100 has created quantised demand signals and avoided the generation of repeating patterns of cylinder activation beyond a predetermined length without a requirement to modify the ECM controller 50 or to change the algorithm (sigma-delta algorithm) which it employs. Accordingly, the precise cylinders which are actually caused to carry out active cycles in order to implement the demanded displacement are determined by the ECM controller. Typically, they are not predetermined and will vary from one use to the next, depending on the time history of shaft revolutions and demanded displacement.

As we have explained, it is normally advantageous for electrically commutated hydraulic machines to intersperse active and inactive cycles of working chamber volume to meet fractional displacement demands and commonly each active cycle has the same net displacement, which is the maximum net displacement of each working chamber. However, with reference to FIGS. 7A to 7C we will now describe an embodiment in which stroke volume of the working chambers, during active cycles is reduced by amending valve timing. Although this can be less efficient in some ways, this can be combined with the quantisation approach discussed above, leading to a reliable machine which suppresses the generation of undesired, e.g. low frequency, vibrations which can provide a wide (and in some embodiments) continuous range of displacement fractions.

In these embodiments, the net displacement during an active cycle is reduced below 100% of the maximum displacement by varying the timing of the active control of the low-pressure and high-pressure valves. Methods for doing so are known from WO 2004/025122. For example, during a pumping cycle, the timing of the closure of low-pressure valve may be delayed from its usual phase, shortly after the point of maximum cylinder volume (top dead centre). For a short delay this gives a slightly reduced displacement. If the closure of the low-pressure valve is delayed until close to the point of minimum cylinder volume (top dead centre), the displacement is reduced to a small fraction of maximum displacement. In the case of a motoring cycle, the low-pressure valve is opened and the high-pressure valve closed earlier than would otherwise be the case during the expansion stroke (from top dead centre to bottom dead centre), reducing the volume of working fluid which is received from the high-pressure manifold. This step usually occurs late in the expansion stroke and bringing it forward slightly will slightly reduce the displacement whereas bringing it forward to shortly after the point of minimum cylinder volume will greatly reduce the net displacement.

Figures 7A, 7B, 7C:
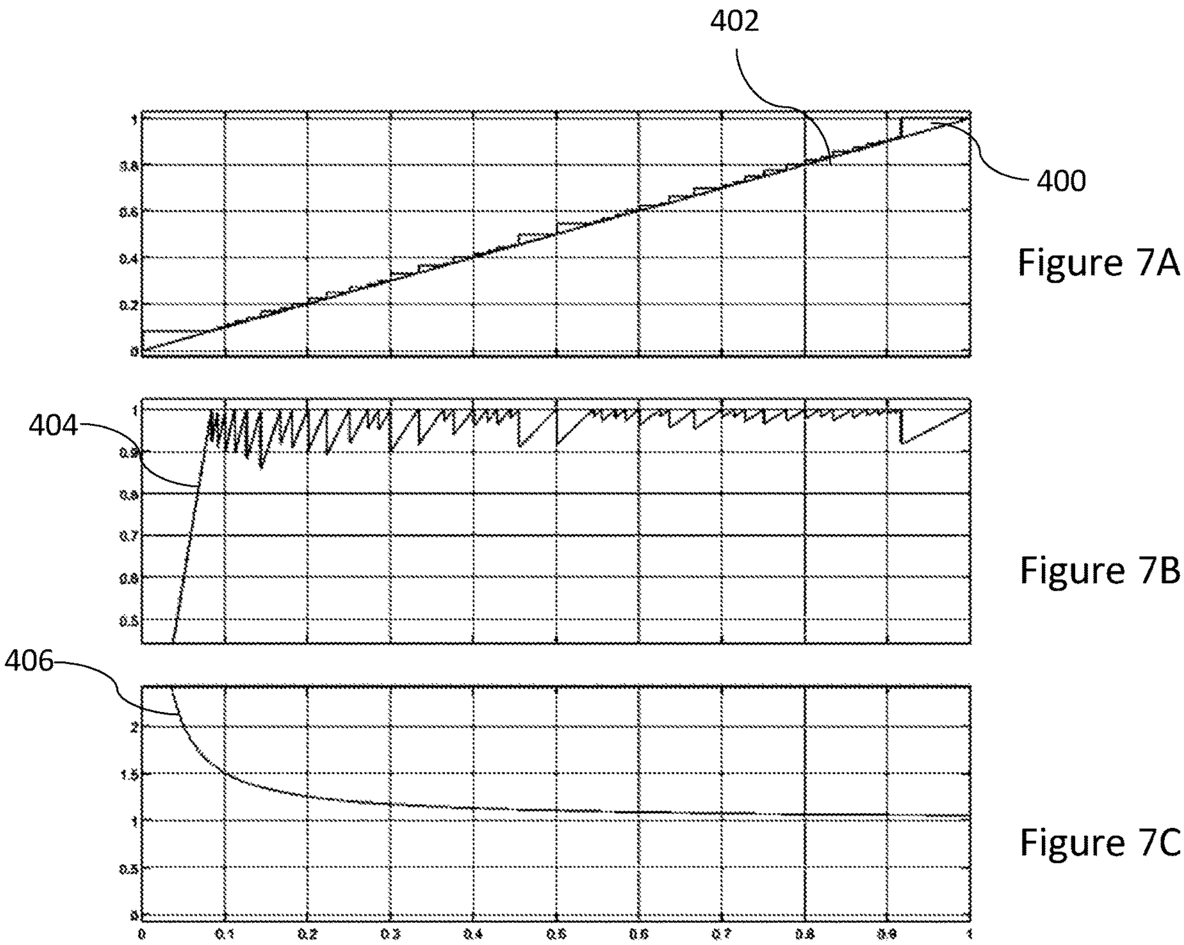
FIGS. 7A through 7C show the variation in fractions of cylinders active (7A), part stroke size as a fraction of maximum (7B) and scale factor (7C) with displacement demand, Fd.

In operation, for any given value of received (e.g. calculated or input) displacement demand Fd (x-axis), the Fd is multiplied by a scaling factor 406, which is intended to ensure that the quantised displacement fraction chosen will always be greater than the demand, so that by reducing the volume delivered by each cylinder (by adjusting the valve timing) the actual demand displacement can still be achieved. FIGS. 7A and 7B employ the scale factor. As can be seen in FIG. 7A, the fraction of cylinders which carry out active cycles is quantised as before, thereby suppressing the generation of unwanted frequency components. However, the valve timings are amended such that the total net displacement more closely matches the demanded displacement. It is desirable that the stroke size of each cylinder is kept as close as possible to 100%, in order to achieve this the scale factor used to 'round up' the displacement must itself be a function of the Fd, as seen in FIG. 7C. By using a function of this type it is possible to keep the quantised Fd at an approximately fixed level above the Fd demand, and thus ensure that the stroke size is maximised.

By a way of example, 0.9 on the y-axis of FIG. 7B corresponds to net displacement by each cylinder being 90% of the volume delivered when using a full stroke (maximum). The quantisation of the displacement demand is useful to control the frequency content of the machine output, as a result of the cylinder enabling algorithm, and it can be seen from the left hand side of FIGS. 7A to 7C that at low displacement demands the frequency of cylinder activation does not drop below a threshold (approximately 0.1), instead the part stroke volume decreases. This avoids the generation of pulse patterns with very low frequency content, whilst still enabling the output displacement closely matched the input displacement demand. A similar effect can be seen at high displacement demand, where the method avoids generation of low frequency patterns of cylinder inactivation.

As shown in the above and in FIG. 7A, it can be seen that the quantised demand sent to the ECM controller 50 is always higher than the continuous displacement demand. The requirement is that the quantised active cycle fraction is higher than the continuous displacement demand, and means the part stroke size can be 1 or lower in order to achieve the continuous displacement demand exactly. If the quantised demand were lower than the continuous displacement demand, then the part stroke size required to achieve the continuous displacement would need to be larger than 1, which is impossible.

Although it is possible to leave gaps in displacement which cannot be met, if it is ensured that the quantised demand signal is larger than the continuous displacement demand throughout the displacement range then gaps can be avoided. In this example, this is achieved by multiplying the continuous displacement demand by the scale factor shown in FIG. 7C although this is not the only possible approach. For example, a bias could be applied to the continuous demand and this may also vary throughout the displacement range.

In an alternative embodiment, gaps are addressed by selecting the discrete active cycle fraction closest to the continuous displacement demand and applying no upwards hysteresis, but only downwards hysteresis. These methods prevent requesting a part stroke fraction higher than 1 of the enabling cylinders. For reasons previously mentioned, it is preferable that the part stroke size is as close to full stroke size as possible throughout the displacement range.

Hysteresis can prevent jumping between quantised steps when the demanded displacement is noisy. In the case shown in FIG. 7A, where the Fd (straight line continuous displacement demand) signal is smooth, hysteresis (or scaling) may be omitted and it would be sufficient to round up to the nearest quantised step which is above the (straight line continuous displacement demand) Fd. Unfortunately, in reality the demand signal will contain noise, and thus we need some hysteresis, by which we mean a difference in threshold on the decision to change up a step versus to change down a step. Applying hysteresis to the quantiser prevents switching back and forth between steps if there is noise, provided there is sufficient hysteresis. If the noise level is bigger than the steps themselves, no amount of hysteresis alone will help.

An alternative and potentially preferable approach is to employ backlash. Backlash prevents the output signal from changing when the rate of change of the input signal changes sign. This usually has a single parameter, called 'deadband', which is the amount of the difference between input and output which will cause the output to start following input again. This type of signal processing often causes an offset between the input and output signals. It is possible to correct for the offset by using scaling, such as that shown in the graph of FIG. 7C. The scaling function is of type y=n/x+1 where n is half of the deadband width.

In the above examples, the discrete values in the quantisation tables correspond to the discrete fractions of working chambers which will carry out active cycles of working chamber volume. This arises because the units of the demand signal are displacement fraction. However, this is not essential.

Further variations and modifications may be made within the scope of the invention herein disclosed.

The invention claimed is:

1. A method of operating an apparatus, the apparatus comprising a prime mover and a plurality of hydraulic actuators, a hydraulic machine having a rotatable shaft in driven engagement with the prime mover and comprising a plurality of working chambers having a volume which varies cyclically with rotation of the rotatable shaft, a hydraulic circuit extending between a group of one or more working chambers of the hydraulic machine and one or more of the hydraulic actuators, each working chamber of the hydraulic machine comprising a low-pressure valve configured to regulate a flow of hydraulic fluid between the working chamber and a low-pressure manifold and a high-pressure valve configured to regulate the flow of hydraulic fluid between the working chamber and a high-pressure manifold, the hydraulic machine being configured to actively control at least the low-pressure valves of the group of one or more working chambers to select a net displacement of hydraulic fluid by each working chamber on each cycle of working chamber volume, and thereby a net displacement of hydraulic fluid by the group of one or more working chambers, responsive to a demand signal, the method comprising controlling the valves to cause each working chamber to carry out either an active or an inactive cycle of working chamber volume during each cycle of working chamber volume, wherein a fraction of the working chambers of the plurality of working chambers of the hydraulic machine carry out active cycles, and the fraction is variable and is selected from of a plurality of discrete fractions.

2. The method according to claim 1, wherein the plurality of discrete fractions are selected to avoid generating any repeating patterns of active and inactive cycles of working chamber volume with a length greater than a predetermined maximum repeat pattern length.

3. The method according to claim 2, wherein the plurality of discrete fractions do not include any fractions with a denominator greater than a predetermined maximum denominator, when expressed as irreducible fractions.

4. The method according to claim 1, wherein the demand signal to which the hydraulic machine responds is quantised, having one of a plurality of discrete values.

5. The method according to claim 1, wherein the discrete fractions are expressed as irreducible fractions, the denominators range up to a maximum which is selected to avoid generating repeating patterns of working chamber actuation with a frequency less than a predetermined minimum.

6. The method according to claim 1, wherein a smallest non-zero fraction in the plurality of discrete fractions is 1/n, and n is an integer.

7. The method according to claim 1, wherein a smallest non-zero fraction in the plurality of discrete fractions is 1/n, and a second smallest fraction in the plurality of discrete fractions is 1/(n−1), where n is an integer.

8. The method according to claim 1, wherein a smallest non-zero fraction in the plurality of discrete fractions is selected taking into account that two or more working chambers have the same phase or that there are uneven phase differences between two or more working chambers.

9. The method according to claim 1, wherein the discrete fractions are determined by simulation or experiment.

10. The method according to claim 9, wherein the discrete fractions are included in the plurality of discrete fractions in response to simulation or experiment showing that a frequency content of a resulting high pressure manifold pressure, or valve activation currents, or other signals, meets one or more acceptable frequency spectrum criteria and/or where the frequency content below a cut-off frequency is below a threshold, or where an effect of selection of active and inactive cycles is found to be acceptable.

11. The method according to claim 4, wherein the discrete fractions and/or the plurality of discrete values of the quantised demand signal are calculated during runtime and/or calculated in real time taking into account pre-determined parameters and/or current measured parameters.

12. The method according to claim 1, wherein the plurality of discrete fractions are varied responsive to speed of rotation of the rotatable shaft or another operating parameter of the apparatus, optionally wherein the method comprises switching from using a first plurality of discrete fractions to a second plurality of discrete fractions when the speed of rotation of the rotatable shaft exceeds a threshold.

13. The method according to claim 1, wherein timing of opening or closing of at least the low-pressure valves are regulated to vary a fraction of maximum stroke volume which is displaced by each working chamber during each active cycle, optionally wherein regulating the timing of opening or closing of at least the low-pressure valves enables a continuous range of displacements per revolution of the rotatable shaft to be generated although the fraction of working chambers which carry out active cycles is limited to be one of a plurality of discrete fractions.

14. The method of calculating a plurality of discrete fractions for use in the method of claim 1, the method comprising inputting a minimum allowable frequency, a target operation speed of rotation of a rotatable shaft and data indicative of a number and/or phase difference between working chambers of the machine, and/or phase difference between working chambers in a group, calculating an integer number, n, of working chamber decision points between active cycles which will lead to generation of frequencies of cylinder activation only in excess of the minimum allowable frequency, and including 1/n in the plurality of discrete fractions.

15. The method according to claim 14, further comprising including within the plurality of discrete fractions a plurality of fractions having denominators being integers up to n and numerators being integers up to n−1, after removing duplicate values.

16. The method according to claim 14, comprising removing one or more discrete fractions from the plurality of discrete fractions to avoid generation of repeating cylinder activation patterns with frequency components below a specific value.

17. The method according to claim 13, further comprising storing the plurality of discrete fractions on a solid-state memory device for retrieval during operation.

18. A solid-state memory device storing a plurality of discrete fractions calculated according to the method of claim 15.

19. An apparatus comprising a prime mover and a plurality of hydraulic actuators, a hydraulic machine having a rotatable shaft in driven engagement with the prime mover and comprising a plurality of working chambers having a volume which varies cyclically with rotation of the rotatable shaft, a hydraulic circuit extending between a group of one or more working chambers of the hydraulic machine and one or more of the hydraulic actuators, each working chamber of the hydraulic machine comprising a low-pressure valve configured to regulate a flow of hydraulic fluid between the working chamber and a low-pressure manifold and a high-pressure valve configured to regulate the flow of hydraulic fluid between the working chamber and a high-pressure manifold, the hydraulic machine comprising a controller configured to actively control at least the low-pressure valves of the group of one or more working chambers to select a net displacement of hydraulic fluid by each working chamber on each cycle of working chamber volume, and thereby a net displacement of hydraulic fluid by the group of one or more working chambers, responsive to a demand signal, the controller configured to control the valves to cause each working chamber to carry out either an active or an inactive cycle of working chamber volume during each cycle of working chamber volume, wherein the apparatus is configured such that a fraction of working chambers of the plurality of working chambers of the hydraulic machine carry out active cycles, and the fraction is variable and is selected from a plurality of discrete fractions.

* * * * *